(12) United States Patent
Shechtman et al.

(10) Patent No.: US 9,729,787 B2
(45) Date of Patent: Aug. 8, 2017

(54) CAMERA CALIBRATION AND AUTOMATIC ADJUSTMENT OF IMAGES

(71) Applicant: Adobe Systems Incorporated, San Jose, CA (US)

(72) Inventors: Elya Shechtman, Seattle, WA (US); Jue Wang, Woodinville, WA (US); Hyunjoon Lee, Jecheon (KR); Seungyong Lee, Pohang (KR)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/357,866

(22) Filed: Nov. 21, 2016

(65) Prior Publication Data
US 2017/0069088 A1    Mar. 9, 2017

Related U.S. Application Data

(63) Continuation of application No. 14/798,285, filed on Jul. 13, 2015, now Pat. No. 9,519,954, which is a
(Continued)

(51) Int. Cl.
*H04N 17/00* (2006.01)
*H04N 17/02* (2006.01)
(Continued)

(52) U.S. Cl.
CPC .......... *H04N 5/23229* (2013.01); *G06T 3/00* (2013.01); *G06T 3/608* (2013.01); *G06T 5/00* (2013.01);
(Continued)

(58) Field of Classification Search
CPC .... H04N 17/00; H04N 17/02; H04N 5/23229; H04N 5/232; G06T 15/20; G06T 3/00;
(Continued)

(56) References Cited

U.S. PATENT DOCUMENTS

| 5,448,322 A | 9/1995 | Bacs, Jr. |
| 5,973,700 A | 10/1999 | Taylor et al. |

(Continued)

FOREIGN PATENT DOCUMENTS

| WO | WO-2012044308 | 4/2012 |
| WO | WO-2013163579 | 10/2013 |

OTHER PUBLICATIONS

"Corrected Notice of Allowance", U.S. Appl. No. 14/681,913, Jan. 31, 2017, 2 pages.

(Continued)

*Primary Examiner* — Trang U Tran
(74) *Attorney, Agent, or Firm* — Wolfe-SBMC

(57) ABSTRACT

Techniques and apparatus for automatic upright adjustment of digital images. An automatic upright adjustment technique is described that may provide an automated approach for straightening up slanted features in an input image to improve its perceptual quality. This correction may be referred to as upright adjustment. A set of criteria based on human perception may be used in the upright adjustment. A reprojection technique that implements an optimization framework is described that yields an optimal homography for adjustment based on the criteria and adjusts the image according to new camera parameters generated by the optimization. An optimization-based camera calibration technique is described that simultaneously estimates vanishing lines and points as well as camera parameters for an image; the calibration technique may, for example, be used to generate estimates of camera parameters and vanishing points and lines that are input to the reprojection technique.

20 Claims, 25 Drawing Sheets

Related U.S. Application Data continuation of application No. 13/871,597, filed on Apr. 26, 2013, now Pat. No. 9,098,885.

(60) Provisional application No. 61/639,721, filed on Apr. 27, 2012.

(51) Int. Cl.

| | |
|---|---|
| *H04N 5/232* | (2006.01) |
| *G06T 5/00* | (2006.01) |
| *G06T 3/60* | (2006.01) |
| *G06T 3/00* | (2006.01) |
| *G06T 15/20* | (2011.01) |
| *G06T 7/80* | (2017.01) |
| *G06T 7/00* | (2017.01) |

(52) U.S. Cl.
CPC ............ *G06T 5/006* (2013.01); *G06T 7/0018* (2013.01); *G06T 7/80* (2017.01); *G06T 15/20* (2013.01)

(58) Field of Classification Search
CPC ........... G06T 5/00; G06T 3/608; G06T 5/006; G06T 7/0018
USPC .................................. 348/187, 175, 176, 188
See application file for complete search history.

(56) References Cited

U.S. PATENT DOCUMENTS

| | | | |
|---|---|---|---|
| 6,917,702 B2 | 7/2005 | Beardsley | |
| 7,356,425 B2 | 4/2008 | Krahnstoever et al. | |
| 7,512,261 B2 | 3/2009 | Lou et al. | |
| 7,974,462 B2 | 7/2011 | Takemoto et al. | |
| 8,208,029 B2 | 6/2012 | Kim et al. | |
| 8,638,986 B2 | 1/2014 | Jiang et al. | |
| 8,886,449 B2 * | 11/2014 | Vaddadi .................. | G06F 17/00 701/300 |
| 9,008,460 B2 | 4/2015 | Shechtman et al. | |
| 9,098,885 B2 | 8/2015 | Schechtman et al. | |
| 9,277,206 B1 | 3/2016 | Lloyd et al. | |
| 9,338,447 B1 | 5/2016 | Crump et al. | |
| 9,519,954 B2 | 12/2016 | Shechtman et al. | |
| 9,582,855 B2 | 2/2017 | Shechtman et al. | |
| 2002/0018279 A1 | 2/2002 | Molsen | |
| 2004/0046885 A1 | 3/2004 | Regan et al. | |
| 2005/0179688 A1 | 8/2005 | Chernichenko et al. | |
| 2006/0078214 A1 | 4/2006 | Gallagher | |
| 2007/0076977 A1 | 4/2007 | Chen et al. | |
| 2010/0295948 A1 | 11/2010 | Xie et al. | |
| 2012/0133780 A1 | 5/2012 | Zhang et al. | |
| 2013/0063574 A1 * | 3/2013 | Callway ............. | H04N 13/0025 348/51 |
| 2013/0194418 A1 | 8/2013 | Gonzalez-Banos et al. | |
| 2013/0251205 A1 | 9/2013 | Foote et al. | |
| 2013/0286221 A1 | 10/2013 | Shechtman | |
| 2013/0287318 A1 | 10/2013 | Shechtman | |
| 2015/0215531 A1 | 7/2015 | Schechtman et al. | |
| 2015/0324985 A1 | 11/2015 | Shechtman et al. | |

OTHER PUBLICATIONS

"Corrected Notice of Allowance", U.S. Appl. No. 13/871,521, Mar. 17, 2015, 2 pages.
"Final Office Action", U.S. Appl. No. 13/871,597, Dec. 26, 2014, 10 pages.
"International Search Report and Written Opinion", Application No. PCT/US2013/038462, Nov. 7, 2013, 23 pages.
"Non-Final Office Action", U.S. Appl. No. 13/871,521, Aug. 27, 2014, 6 pages.
"Non-Final Office Action", U.S. Appl. No. 13/871,597, Jul. 8, 2014, 7 pages.
"Notice of Allowance", U.S. Appl. No. 13/871,521, Dec. 5, 2014, 6 pages.
"Notice of Allowance", U.S. Appl. No. 13/871,597, Mar. 27, 2015, 6 pages.
"Notice of Allowance", U.S. Appl. No. 14/681,913, Nov. 16, 2016, 8 pages.
"Notice of Allowance", U.S. Appl. No. 14/798,285, Aug. 2, 2016, 7 pages.
"Pre-Interview Communication", U.S. Appl. No. 14/681,913, Aug. 23, 2016, 3 pages.
"Restriction Requirement", U.S. Appl. No. 13/871,597, Jun. 5, 2014, 8 pages.
"Supplemental Notice of Allowance", U.S. Appl. No. 13/871,597, Jun. 25, 2015, 2 pages.
"Supplemental Notice of Allowance", U.S. Appl. No. 14/798,285, Nov. 14, 2016, 3 pages.
Barinova,"Geometric image parsing in man-made environments", IJCV, 2011, 2011, 14 pages.
Canny,"A Computational Approach to Edge Detection", IEEE Transactions on Pattern Analysis and Machine Intelligence, vol. PAMI-8, No. 6, Nov. 6, 1986, 20 Pages.
Carroll,"Image Warps for Artistic Perspective Manipulation", ACM Transactions on Graphics, vol. 29, No. 4, Jan. 2010, 9 pages.
Comaniciu,"Mean Shift: A Robust Approach Toward Feature Space Analysis", IEEE Transactions on Pattern Analysis and Machine Intelligence, vol. 24, No. 5, May 2002, pp. 603-619.
Coughlan,"Manhattan World: Compass Direction from a Single Image by Bayesian Inference", In Proceedings of Seventh IEEE International Conference on Computer Vision, vol. 2, Sep. 1999, pp. 941-947.
D'Amelio,"Perspective Drawing Handbook", Dover Publications, 2004, 98 pages.
Datta,"Studying Aesthetics in Photographic Images Using a Computational Approach", Proceedings of the European Conference on Computer Vision, 2006, 14 pages.
Denis,"Efficient edge-based methods for estimating Manhattan frames in urban imagery", in Proceedings ECCV, 2008, Jul. 2008, 88 pages.
Dhar,"High Level Describable Attributes for Predicting Aesthetics and Interestingness", In Proceedings CVPR, 2011, 2011, pp. 1657-1664.
Freeman,"The Photographer's Eye: Composition and Design for Better Digital Photos", Focal Press, 2007, 2007, 99 pages.
Gallagher,"Using Vanishing Points to Correct Camera Rotation in Images", In 2nd Canadian Conference on Computer and Robot Vision, May 9, 2005, 8 pages.
Hartley,"Multiple View Geometry in Computer Vision, Chapter 8", Cambridge University Press, 2004, 2004, 10 pages.
Ke,"The Design of High-Level Features for Photo Quality Assessment", In Proceedings CVPR, 2006, 2006, 8 pages.
Kosecka,"Video Compass", In Proceedings ECCV, 2002, 2002, 15 pages.
Liebowitz,"Metric rectification for perspective images of planes", In Proceedings CVPR, 1998, 1998, 7 pages.
Liu,"Optimizing photo composition", Computer Graphic Forum vol. 29, No. 2, 2010, 2010, 10 pages.
Luo,"Photo and Video Quality Evaluation: Focusing on the Subject", Proceedings of the European Conference on Computer Vision, 2008, 14 pages.
Mirzaei,"Optimal Estimation of Vanishing Points in a Manhattan World", In Proceedings ECCV, 2008, 2008, 8 pages.
Muller,"Image-based procedural modeling of facades", 2007, 9 pages.
Nebehay,"A Self-Calibration Method for Smart Video Cameras", In Proceedings of ICCV Workshop 2009, Sep. 2009, pp. 840-846.
Schindler,"An Expectation Maximization Framework for Simultaneous Low-level Edge Grouping and Camera Calibration in Complex Man-made Environments", In Proceedings of CVPR 2004, Jun. 2004, 8 pages.
Tardif,"Non-iterative approach for fast and accurate vanishing point detection", In Proceedings ICCV, 2009, 2009, 8 pages.
von"LSD: A Line Segment Detector", IEEE PAMI, 2010, 2010, 10 pages.

(56) References Cited

OTHER PUBLICATIONS

Wong, "Saliency retargeting: An approach to enhance image aesthetics.", In Proceedings WACV, 2011, 2011, 8 pages.
Zhang, "Camera calibration with lens distortion from low-rank textures.", In Proceedings CVPR, 2011, 2011, 9 pages.

* cited by examiner

CAMERA CALIBRATION AND AUTOMATIC ADJUSTMENT OF IMAGES

RELATED APPLICATIONS

This application is a continuation of, and claims priority under 35 U.S.C. Section 120 to U.S. patent application Ser. No. 14/798,285, filed Jul. 13, 2015, and titled "Camera Calibration and Automatic Adjustment of Images," which is a continuation of, and claims priority to, U.S. patent application Ser. No. 13/871,597, filed Apr. 26, 2013, and titled "Camera Calibration and Automatic Adjustment of Images," which claims priority under 35 U.S.C. Section 119(e) to U.S. Provisional Patent Application No. 61/639,721, filed Apr. 27, 2012, and titled "Methods and Apparatus for Automatic Upright Adjustment of Digital Images," the disclosures of which are hereby incorporated by reference in their entirety.

BACKGROUND

Images (whether digital images or conventional film images) captured by photographers often contain perspective distortions. In particular, man-made structures often appear to be distorted in photos captured by casual photographers, as the scene layout often conflicts with expectations of human perception. For instance, when capturing an image of a skyscraper, the building in the image may be skewed and therefore not appear to be straight up. This may be due to the viewpoint being physically constrained, and therefore capturing an image or images from the best viewpoint is not possible. In these cases, a user (photographer, artist, etc.) may want to apply perspective distortion correction to improve the original digital or digitized image to make it appear as if the scene was captured from a better viewpoint. However, this kind of distortion is difficult to fix manually for at least the reason that perspective distortion correction involves three-dimensional (3D) rotation.

SUMMARY

Techniques involving automatic upright adjustment of images are described. Upright adjustment techniques may provide an automated approach for straightening up slanted man-made structures (or other features such as natural features that are relatively straight, such as trees and horizons) in an input image to improve its perceptual quality. This correction may be referred to as upright adjustment. A set of criteria is described for upright adjustment based on human perception studies. In addition, an optimization framework is described which yields an optimal homography for adjustment. Further, an optimization-based camera calibration technique is described that performs favorably when compared to conventional techniques, and that enables implementations of the automatic upright adjustment techniques to work reliably for a wide variety of images.

Implementations may provide an automatic system for upright adjustment of images that may leverage several criteria for quantitatively measuring the perceived quality of man-made structures or other image features. Following the criteria, a reprojection technique may implement an energy minimization framework that computes an optimal homography to minimize the perceived distortion of slanted structures and other image features. In addition, camera calibration techniques may be employed to simultaneously estimate vanishing lines and points as well as camera parameters that is more accurate and robust than conventional techniques, and may be used to generate estimates of camera parameters and vanishing points and lines that may, for example, be input to the reprojection technique.

Implementations of the automatic upright adjustment technique may handle at least some natural scenes as well as scenes of man-made features. The implementations may work reliably on a wide range of images without involving user interaction.

Figure 1:
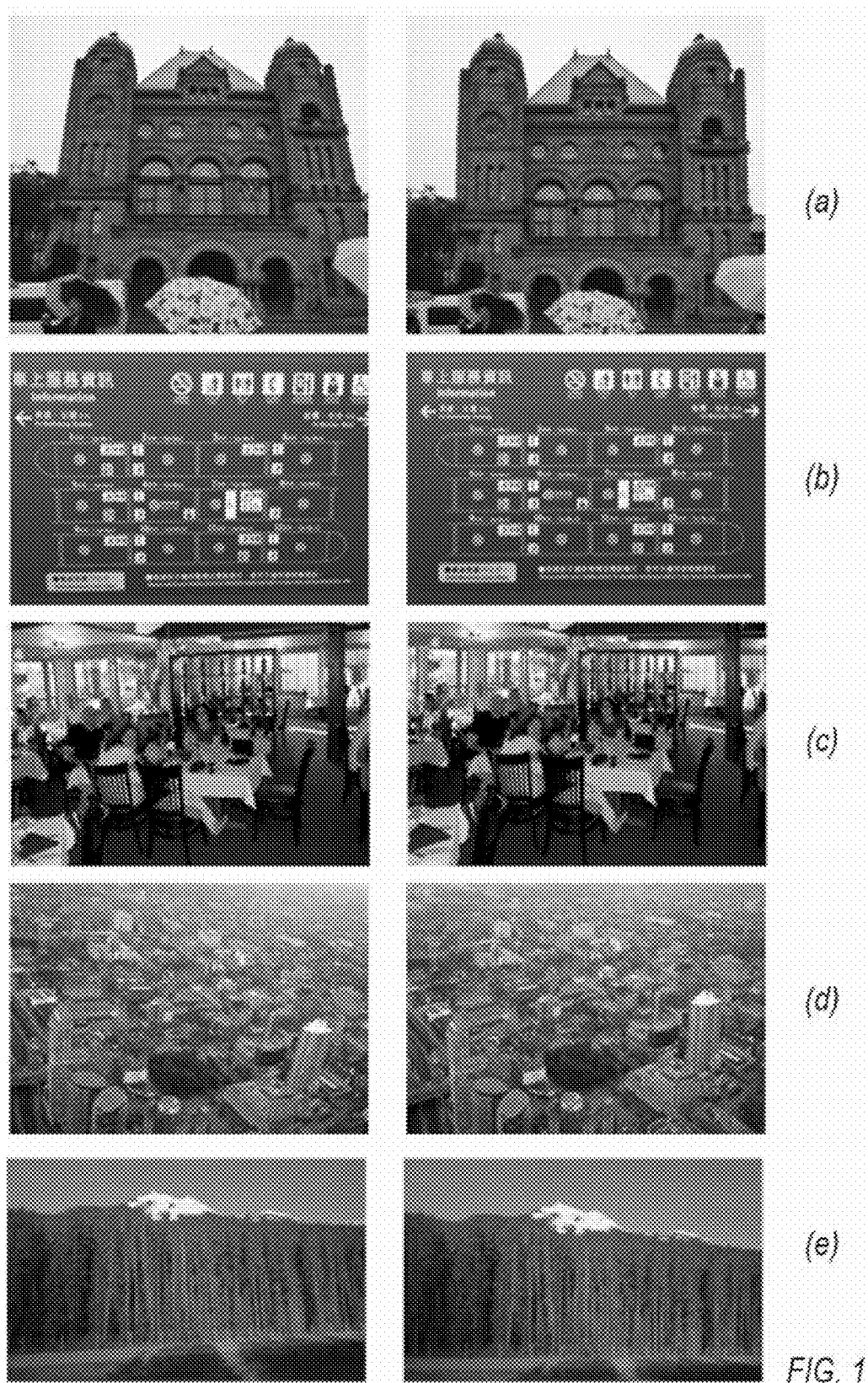
FIG. 1 shows various examples of upright adjustment of images, according to at least some implementations.

While the techniques are described herein by way of example for several implementations and illustrative drawings, those skilled in the art will recognize that the invention is not limited to the implementations or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Overview

A large portion of consumer photos contain man-made structures, such as urban scenes with buildings and streets, and indoor scenes with walls and furniture. However, photographing these structures properly is not an easy task. Photos taken by amateur photographers often contain slanted buildings, walls, and horizon lines due to improper camera rotations, as shown in the left column of FIG. 1.

The human visual system (referred to herein as human perception, or perception) generally expects tall man-made structures and some other features that may appear in some scenes to be straight-up, and horizon lines to be parallel to the eye level. Conflicts with this system may lead the viewer to a feeling of discomfort when looking at a photo containing slanted (not vertical) structures or other features such as tilted (not horizontal) horizons.

Accordingly, automatic image adjustment techniques are described. For example, an automatic adjustment technique may leverage a single homography to correct a photo under a uniform depth assumption for a scene. A homography may be used to describe a relationship between an image and a scene, such as describe a relationship of a viewpoint of the image to the scene. Therefore, the homography in this example may be used to adjust an image to increase consistency with expectations of human perception.

For example, implementations of an automatic upright adjustment technique are described that may provide an automated approach for straightening up slanted or titled man-made structures and natural features that are expected to be relatively straight such as trees and horizons in an input image to improve its perceptual quality. This correction may be referred to as upright adjustment. A set of criteria based on human perception studies is described that are applied during the upright adjustment. The homography may be calculated in a variety of ways, such as through use of an optimization framework that is configured to yield an optimal homography for adjustment according to the criteria.

Implementations of the automatic adjustment techniques may also be used to adjust the perspective of an input image to improve its visual quality. In at least some implementations, to achieve this, a set of criteria is defined based on perception theories. An optimization framework may be applied for measuring and adjusting the perspective according to the criteria. In at least some implementations, additional constraints may be incorporated to avoid perspective distortions on features such as faces or circles. In addition to applications for adjusting still photos, implementations may be adapted to adjust video frames and thus images may be used to refer to either instance.

Additionally, camera calibration techniques are described. The camera calibration techniques may be used to describe characteristics of an image. These characteristics may then be used as a basis to adjust the image as above. For example, the camera calibration techniques may be used to estimate vanishing lines and points as well as camera parameters in conjunction with each other, i.e., simultaneously. These estimates may then be used as part of the homography above to transform the image based on human perception based criteria to achieve visually plausible results. Further discussion of camera calibration techniques may be found in relation to the camera calibration section below.

In the following detailed description, numerous specific details are set forth to provide a thorough understanding of claimed subject matter. However, it will be understood by those skilled in the art that claimed subject matter may be practiced without these specific details. In other instances, techniques, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Implementation Example

FIG. 1 shows various examples of upright adjustment of images according to at least some implementations of the automatic upright adjustment techniques. The left column shows the original images, while the right column shows the resulting images generated according to an implementation of the upright adjustment technique described herein. The top two images (a) show an urban building scene from the street level, the second two images (b) show a planar board, the next two images (c) show an indoor restaurant scene, the next two images (d) show an aerial urban scene, and the last two images (e) show a natural scene with mountains and trees.

Assuming the depth variations of the scene relative to its distance from the camera are small, correcting a slanted structure involves a 3D rotation of the image plane. This correction may be referred to as upright adjustment, since it is used to make manmade (or other) structures appear "straight up" as expected by human perception. Similar corrections have been known as keystoning and perspective correction, which can be achieved by manually warping the image using conventional digital image processing tools, or during capture using a special Tilt Shift lens. However, the target domain of these tools typically involves facades of buildings, while implementations of the upright adjustment technique do not explicitly assume specific types of objects in the scene. In addition, manual correction may involve special skills and become tedious when used to process dozens or hundreds of photos.

Implementations may provide an automatic system for upright adjustment of photos that includes, but is not limited to, the following:

several criteria for quantitatively measuring the perceived quality of man-made structures or other image features, based on previous studies on human perception;

following the criteria, an energy minimization framework that computes an optimal homography that can effectively minimize the perceived distortion of slanted structures and other image features; and a camera calibration technique which simultaneously estimates vanishing lines and points as well as camera parameters, and is more accurate and robust than conventional techniques.

Implementations of the automatic upright adjustment technique may handle at least some natural scenes as well as scenes of man-made features (see the last two images (e) in FIG. 1 for an example). Implementations may also work reliably on a wide range of images without user interaction.

Automatic Adjustment Technique

Figure 2:
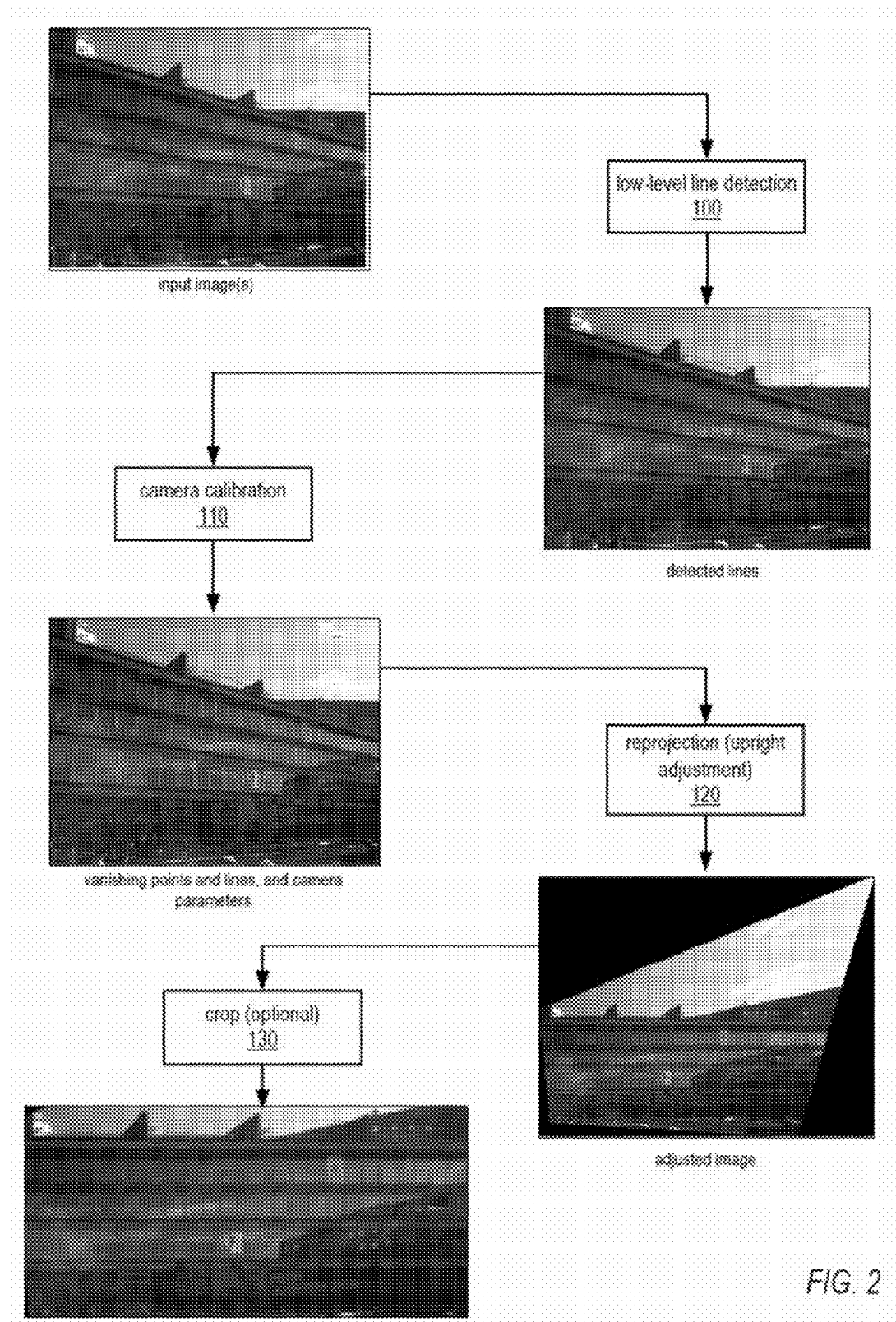
FIG. 2 is a high-level flowchart of the automatic upright adjustment technique, according to at least some implementations.

FIG. 2 is a high-level flowchart depicting an automatic adjustment technique, according to at least some implementations. As indicated at 100, a low-level line detection technique may be applied to an input image (or to each image in an input set of images, such as the frames of a video sequence) to detect lines and edges in the image. Any of various techniques may be used. As indicated at 110, a camera calibration technique that takes at least the line segments as input may be used to estimate vanishing points and lines, as well as other? camera parameters. An optimization-based robust camera calibration technique that may be used in at least some implementations to simultaneously estimate vanishing points and lines, as well as camera parameters, is described later in this document.

As indicated at 120, a reprojection is performed according to the camera parameters and vanishing points and lines to effectively perform the upright adjustment. A reprojection model may be used that implies re-shooting of the rectified scene using another camera placed at a possibly different position with novel orientation. In at least some implementations, this new camera may also be allowed to have different focal lengths in horizontal and vertical directions. An energy minimization or optimization framework that computes an optimal homography that can effectively minimize the perceived distortion of slanted structures and other image features is described that may be used in estimating a new camera used in performing the reprojection. As described above, the homography describes a relationship between two images of a same planar surface, such as different perspectives of the image scene. Therefore, the homography in this example may be used to adjust a viewpoint of a scene in an image to be consistent with expectations of human perception. The energy minimization framework may consider several criteria for quantitatively measuring the perceived quality of man-made structures and other image features based on observations about human perception.

Figure 13A:
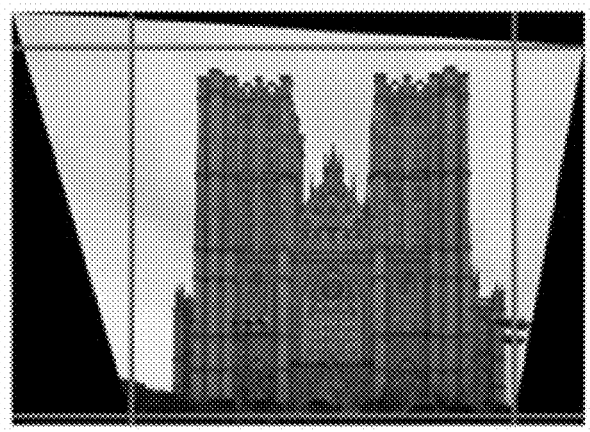
FIGS. 13A and 13B illustrates cropping of an adjusted image, according to at least some implementations.
Figure 13B:
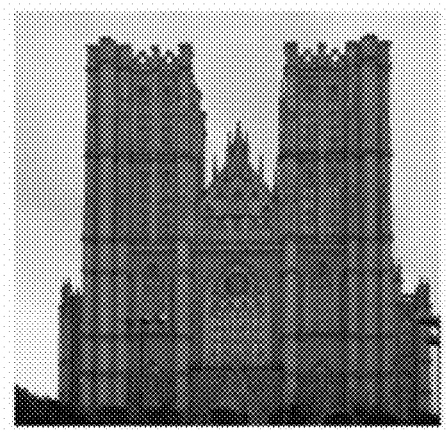

As indicated at 130, the resulting adjusted image may optionally be cropped. Cropping may be performed automatically or manually. FIGS. 13A and 13B illustrate cropping of an adjusted image, according to at least some implementations. FIG. 13A shows an adjusted image generated according to an implementation of the automatic upright adjustment technique, and FIG. 13B shows a crop taken from the image of FIG. 13A.

Figure 3:
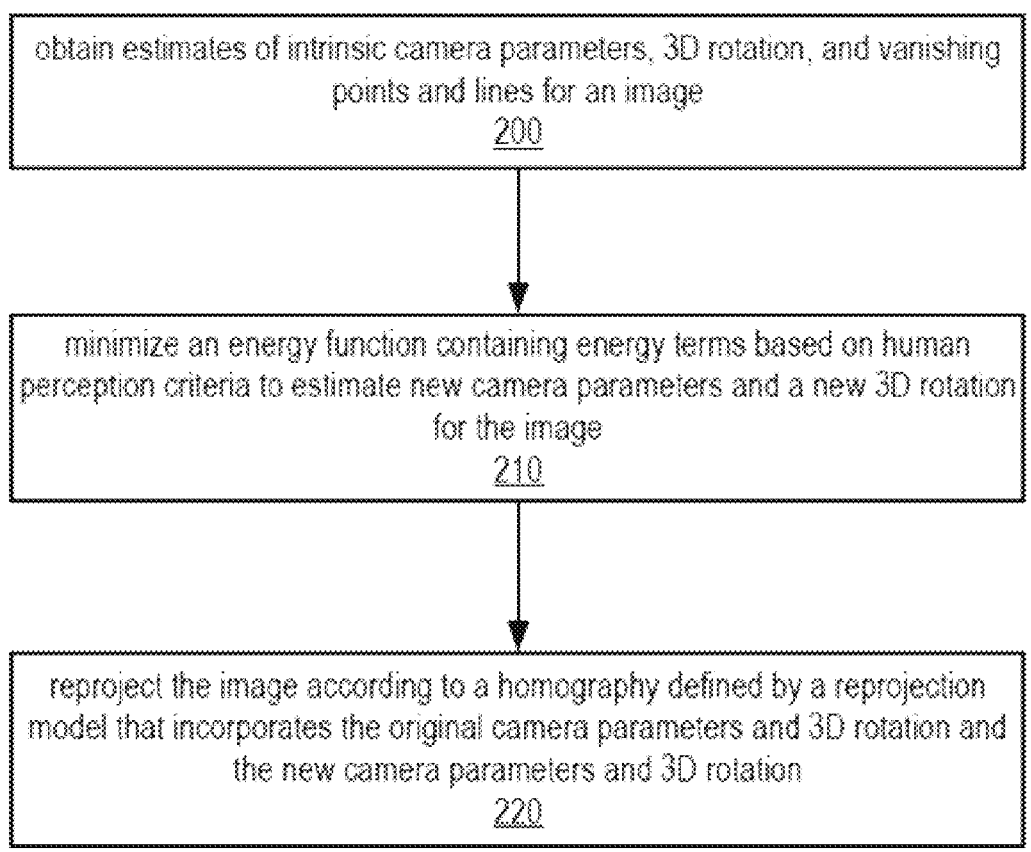
FIG. 3 is a flowchart of a reprojection technique, according to at least some implementations.

FIG. 3 is a flowchart of a reprojection technique for correcting an image of a scene such as a digital or digitized photograph so that features that should appear substantially vertical and/or horizontal according to human perception are adjusted, according to at least some implementations. The flowchart of FIG. 3 provides details of element 120 of FIG. 2, according to at least some implementations. As indicated at 200, intrinsic camera parameters, such as focal length and center of projection (e.g., an intrinsic parameter matrix "K") and 3D rotation information (e.g., 3D rotation matrix "R") and vanishing points and lines (e.g., Manhattan directions "M") for an image of a scene may be obtained i.e. the major line structures of the scene are aligned to the "x," "y," and "z" directions in three dimensions. For example, a rectangular building may be assumed to be oriented following the principal directions of the world.

The camera parameters, 3D rotation information, and vanishing point information may collectively be referred to as original camera information. In at least some implementations, the vanishing points and lines, as well as camera parameters and rotation, may be estimated by an optimization-based, robust camera calibration technique that may be used to simultaneously estimate the vanishing points and lines and the camera parameters and rotation, as described later in this document. However, in some implementations, the vanishing points and lines, camera parameters, and/or 3D rotation may be otherwise estimated and/or obtained. Given the input information, the technique computes a homography that can be applied to the input image to effectively minimize the perceived distortion of slanted or tilted man-made structures and other image features in the image.

Human perception criteria that quantitatively measure the perceived quality of man-made structures or other image features may be used in computing the homography. In at least some implementations, to compute the homography, new camera information that may be used in reprojecting the image is computed. In at least some implementations, to compute the new camera information, an energy function containing energy terms based on the human perception criteria may be minimized to estimate new intrinsic camera parameters and a new 3D rotation for the image, as indicated at 210. The energy function may be initialized according to the original camera information obtained at element 200. Criteria based on human perception that may be used as energy terms to constrain the optimization are described in the section titled Criteria. Mathematical formulations of these criteria are described in the subsection titled Energy terms of the section titled Adjustment Optimization framework. In at least some implementations, the energy function may be minimized subject to a constraint on perspective distortion. In at least some implementations, the energy function may be minimized subject to a constraint on image distortion implemented as one of the energy terms, to minimize distortion of features such as circles and human figures and faces. Other energy terms may include, but are not limited to, a picture-frame alignment energy term and an eye-level alignment energy term. As indicated at 220, the image may then be reprojected according to a homography. In at least some implementations, the homography may be defined by a reprojection model (see Equation (A2)) that incorporates the original camera parameters and 3D rotation (K and R in Equation (A2)) and the new camera parameters and 3D rotation ($K_1$ and $R_1$ in Equation (A2)) computed at element 210 to the original image. In at least some implementations, the reprojection model further incorporates a translation ($t_1$ in Equation (A2)).

Applying the homography to the image may be conceptually viewed as re-capturing the scene using another camera placed at a possibly different position with a new orientation. In at least some implementations, this new camera may also be allowed to have different focal lengths in horizontal and vertical directions. In at least some implementation, a constraint may be applied when minimizing the energy function, implemented as one of the energy terms of the energy function, to prevent the focal lengths in the horizontal and vertical directions from varying too much. Output of the technique of FIG. 3 is an adjusted image in which one or more features of the image that are to appear substantially vertical and/or horizontal according to human perception are adjusted to be more consistent with what the human eye expects to see when viewing the image. For an example of a horizontal feature that has been adjusted, see FIG. 19A, in which the horizon is slightly tilted in an original image, and FIG. 19B, in which the horizon has been adjusted to be more horizontal. For an example of vertical features that have been adjusted, see FIG. 22A, in which the buildings of the skyline are tilted due the optical features of the lens used to capture the original image, and FIG. 22B, in which the buildings have been adjusted to be substantially vertical. Other examples can be seen in FIGS. 1(*a*) through 1(*e*), as well as FIGS. 14A through 21B.

Figure 4:
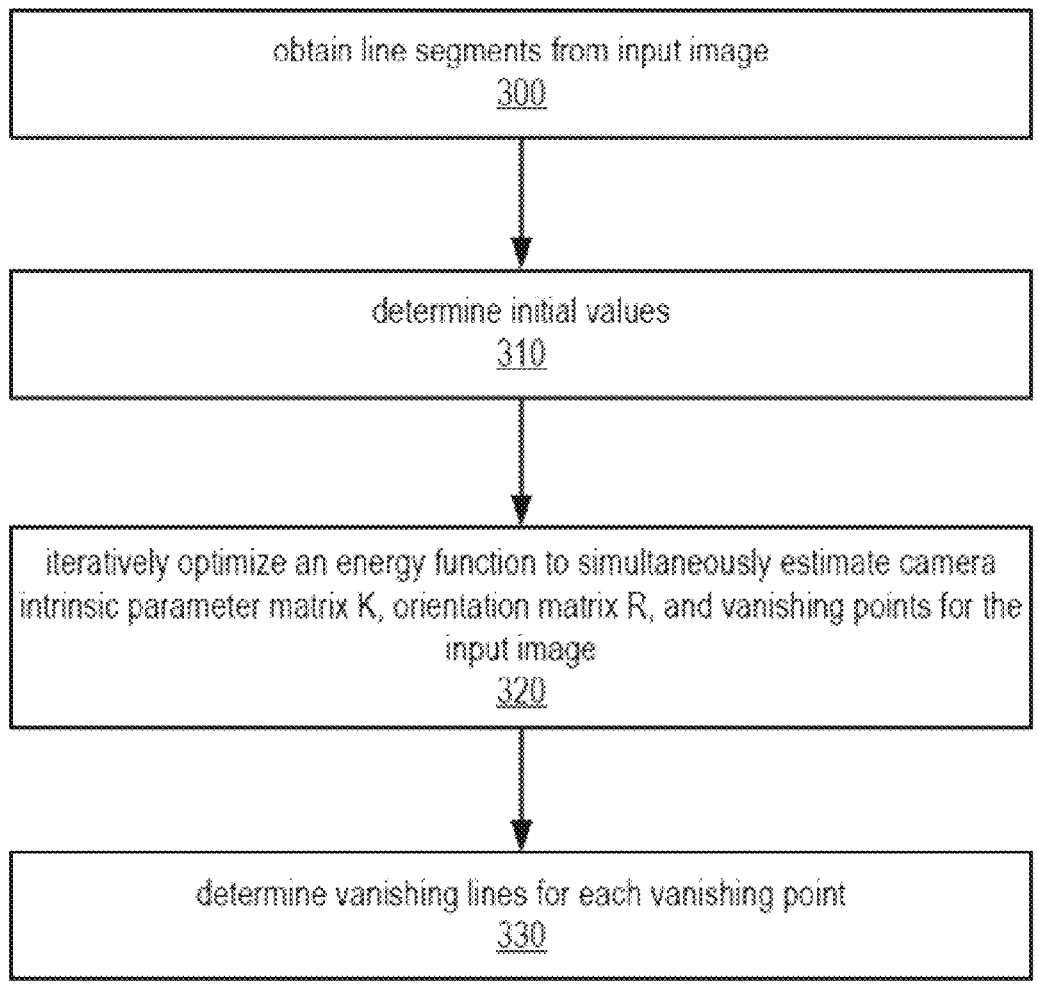
FIG. 4 is a flowchart of a camera calibration technique, according to at least some implementations.

FIG. 4 is a flowchart of a camera calibration technique, according to at least some implementations. The flowchart of FIG. 4 provides details of element 110 of FIG. 2, according to at least some implementations. The camera calibration technique may estimate the camera parameters and vanishing points and lines for an input image in conjunction with each other. Output of the camera calibration technique may be input to the technique of FIG. 3. However, note that the camera calibration technique may be used to generate camera parameters and/or vanishing point information for other digital image processing techniques.

As indicated at 300, a set of line segments from an input image may be obtained. A low-level line detection technique may be applied to an input image (or to each image in an input set of images, such as the frames of a video sequence) to detect lines and edges in the image. Any of various techniques may be used to detect the line segments. As indicated at 310, initial values for the calibration technique may be determined. As indicated at 320, an energy function may be iteratively optimized to simultaneously estimate camera intrinsic parameter matrix "K," orientation matrix "R" (e.g., a rotation matrix that may be used to describe a rotation in two dimensional or three dimensional space), and vanishing points for the input image. The camera intrinsic parameter matrix "K" may describe values such as a focal length, pixel size in one or more directions (e.g., "x" and "y" directions), and a principal point (e.g., which may be defined using "x" and "y" coordinates). As indicated at 330, vanishing lines for each vanishing point may be determined.

In the following sections, various elements of FIGS. 2 through 4 are described in more detail. A set of criteria for upright adjustment of photos that may be used in at least some implementations is first described. A formulation of an image transformation that may be used in at least some implementations is then described. An energy minimization framework that may be used in at least some implementations for performing the upright adjustment according to the criteria is then described. The energy minimization framework assumes as input camera parameters and vanishing points and lines estimated according to a camera calibration technique or other technique. Finally, implementations of a camera calibration technique that may be used in at least some implementations to simultaneously estimate the camera parameters and vanishing points and lines for an input image are described.

Criteria

Scenes with well-structured man-made objects often include many straight lines that are supposed to be horizontal or vertical in the world coordinates in regards to human perception. The criteria described herein, based on observations of human perception, reflect these characteristics. One or more of these criteria may be used as constraints in the optimization framework when optimizing the homography (see Equation (A2)) to estimate then new camera parameters (new intrinsic parameter matrix $K_1$ with additional 3D rotation $R_1$ and translation $t_1$) that are used in the reprojection of the image. Note that the criteria described in this section are described mathematically in the subsection titled Energy terms of the section titled Adjustment Optimization framework.

Picture Frame Alignment

When looking at a big planar facade or a close planar object such as a painting, it is usually perceived as orthogonal to the view direction, and the horizontal and vertical object lines are assumed to be parallel and perpendicular to the horizon, respectively. When a photo of the same scene is viewed, the artificial picture frame (i.e., borders of the image) imposes significant alignment constraints on the object lines, and the viewer may feel discomfort if the object line directions are not well aligned with the picture frame orientation. FIGS. 1(*a*) and 1(*b*) show typical examples. It should be noted that such an artifact becomes less noticeable as the misalignments of line directions become larger, since in that case the viewer begins to perceive 3D depths from a slanted plane.

Eye Level Alignment

The eye level of a photo may be defined as a 2D line that contains the vanishing points of 3D lines parallel to the ground. In a scene of an open field or sea, the eye level may coincide with the horizon. However, even when the horizon is not visible, the eye level can still be defined as the connecting line of specific vanishing points. Eye level alignment may play a significant role in upright adjustment, especially when there are no other major object lines to be aligned to the picture frame. For example, in FIG. 1 (*d*), the invisible eye level is dominantly used to correct an unwanted rotation of the camera.

Perspective Distortion

Since humans do not usually see objects outside the natural field of view (FOV), an object may seem to be distorted when the object is pictured as if it is out of the FOV. This distortion can be hardly seen in ordinary photos, except for those taken with wide-angle lenses. However, such distortion may happen if a large rotation is applied to the image plane, which corresponds to a big change of the camera orientation. To prevent this from happening, at least some implementations may be configured to explicitly constrain perspective distortion in the upright adjustment process.

Image Distortion

When a transformation is applied to a photo, image distortion cannot be avoided. However, the human visual system may be tolerant to distortions of rectangular objects, while it is sensitive to distortions of circles, faces, and other familiar objects. This phenomenon may be considered in at least some implementations of the upright adjustment technique to reduce the perceived distortions in the resulting image as much as possible.

Formulation of the Image Transformation Used for Upright Adjustment

Implementations may assume that depth information is not available for the input image, and thus a homography may be used to transform the image for upright adjustment. A transformation may be used in some implementations, such as content-preserving warping. However, such a transformation contains more degrees of freedom, and therefore involves a large amount of reliable constraints that are then fulfilled with user interaction or additional information about the scene geometry. Accordingly, a homography may be used to achieve visually plausible results, especially for man-made structures. A given image can be rectified with a homography matrix "H" using the following equation:

$$p'=Hp=K(KR)^{-1}p, \quad (A1)$$

where "p" and "p'" represent a position and its re-projection in the image, respectively "K" and "R" are intrinsic parameters and orientation matrices of the camera, respectively:

$$K = \begin{pmatrix} f & 0 & u_0 \\ 0 & f & v_0 \\ 0 & 0 & 1 \end{pmatrix} \text{ and } R = R_\psi R_\theta R_\phi,$$

where "$R_\psi$," "$R_\theta$," and "$R_\phi$" are rotation matrices with angles "$\Psi$," "$\theta$," and "$\phi$" along the "x," "y," and "z" axes, respectively. Note that "R" may be referred to herein as an orientation matrix "R."

Figure 9A:
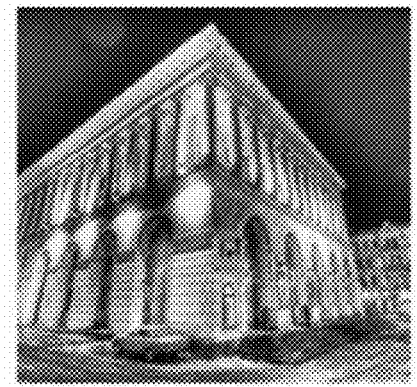
FIGS. 9A through 9C illustrate perspective distortion control, according to at least some implementations.
Figure 9B:
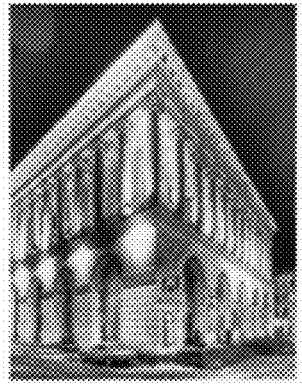

In some instances, image rectification may generate a visually unpleasing result (see, e.g., FIG. 9B). In at least some implementations of the automatic upright adjustment technique, for upright adjustment, Equation (AI) may be modified to support flexible control for enhancing the perceptual quality of the results over that of a simple rectification. In at least some implementations, the homography may be defined by the following re-projection model:

$$p'=Hp=K_1\{R_1(KR)^{-1}p+t_1\}, \quad (A2)$$

where:

$$K_1 = \begin{pmatrix} f_{1x} & 0 & u_1 \\ 0 & f_{1y} & v_1 \\ 0 & 0 & 1 \end{pmatrix}, \quad (A3)$$

$$R_1 = R_{\psi 1} R_{\theta 1} R_{\phi 1},$$

and $$t_1 = [t_{1x} t_{1y} 0]^T.$$

Compared to Equation (AI), Equation (A2) contains an intrinsic parameter matrix "K1" with additional three dimensional rotation "R1" and translation "t1". This re-projection model implies re-shooting of the rectified scene using another camera placed at a possibly different position with novel orientation. In at least some implementations, this new camera may also be allowed to have different focal lengths in horizontal and vertical directions.

Adjustment Optimization Framework

In this section, an energy function for the image transformation (equation (A2)) formulated in the section titled Formulation of the image transformation used for upright adjustment according to the criteria based on human perception defined in the section titled Criteria is described. In at least some implementations, it may be assumed that camera parameters "K" and "R" have been estimated by a camera calibration technique. Thus, there are nine unknowns "$f_{1x}$," "$f_{1y}$," "$u_1$," "$v_1$," "$\Psi_1$," "$\theta_1$," "$\phi_1$," "$t_x$," and "$t_y$" in Equation (A2). However, "$u_1$" and "$v_1$" simply shift the result image after the transformation, and thus may be set as "$u_1=u_0$" and "$v_1=v_0$". In at least some implementations, the objective thus becomes optimizing Equation (A2) with respect to the seven parameters of homography matrix "H."

Although other techniques can also be used for camera calibration, a technique for robust camera calibration that may be used in at least some implementations is presented in the section titled Camera Calibration technique. In the camera calibration technique, at least some implementations may take the Manhattan world assumption, i.e. the major line structures of the scene are aligned to the "x," "y," and "z" directions in three dimensions. For example, a rectangular building may be assumed to be oriented following the principal directions of the world.

In at least some implementations, Manhattan directions "M=[$v_x$ $v_y$ $v_z$]" may be obtained in addition to "K" and "R", where "$v_x$," "$v_y$," and "$v_z$" represent the three vanishing points corresponding to the "x," "y," and "z" directions, respectively. Three pencils of vanishing lines, "$L_x$," "$L_y$," and "$L_z$," which contain two dimensional lines intersecting at vanishing points "$v_x$," "$v_y$," and "$v_z$," respectively, may also be obtained. The vanishing lines in "$L_x$," "$L_y$," and "$L_z$," are projections of three dimensional lines that are parallel to the "x," "y," and "z" axes, respectively.

Energy Terms

Picture Frame Alignment

For major line structures of the scene to be aligned with the picture frame, vanishing lines corresponding to "x" and "y" directions for purposes of human perception should be horizontal and vertical in a photo, respectively. That is, vanishing lines in "$L_x$" and "$L_y$" are to be transformed to horizontal and vertical lines by a homography "H," making vanishing points "$v_x$" and "$v_y$" placed at infinity in the "x" and "y" directions, respectively.

Let "l" be a vanishing line, and "p" and "q" two end points of "l." The direction of the transformed line "l'" may be expressed as follows:

$$d = \frac{q' - p'}{\|q' - p'\|},$$

where:

$$p' = \frac{Hp}{e_z^T Hp} \text{ and } q' = \frac{Hq}{e_z^T Hq}.$$

The expression "$e_z = [0\ 0\ 1]^T$" may be used to normalize homogeneous coordinates. In at least some implementations, the energy term may be defined as:

$$E_{pic} = \lambda_v \sum_i w_i (e_x^T d_{y_i})^2 + \lambda_h \sum_j w_j (e_y^T d_{x_j})^2, \quad (A4)$$

where "$d_{y_i}$" is the direction of the transformed line "$l'_{y_i}$" of a vanishing line "$l_{y_i}$" in "$L_y$". $e_x = [1\ 0\ 0]^T$," and "$e_x^T d_{y_j}$" is the deviation of "$l'_{y_i}$" from the vertical direction. The term "$d_{x_t}$" is defined similarly for a vanishing line "$l_{x_j}$" in "$L_x$," and "$e_y = [0\ 1\ 0]^T$" is used to measure the horizontal device.

In Equation (A4), the weight "w" for a line "l" is the original line length before transformation, normalized by the calibrated focal length "f," i.e., $$w = \|q - p\|/f.$$

In at least some implementations, the weights "$\lambda_v$" and "$\lambda_h$" may be adaptively determined using initial rotation angles, as the constraint of picture frame alignment becomes weaker as rotation angles get bigger. At least some implementations may use:

$$\lambda_v = \exp\left(-\frac{\psi^2}{2\sigma_v^2}\right) \text{ and } \lambda_h = \exp\left(-\frac{\theta^2}{2\sigma_h^2}\right), \quad (A5)$$

where "$\Psi$" and "$\theta$" are calibrated rotation angles along the "x" and "y" axes respectively. "$\sigma_v$" and "$\sigma_h$" are parameters usable to control the tolerances to the rotation angles. In at least some implementations, these control parameters may be fixed as "$\sigma_v = \pi/12$" and "$\sigma_h = \pi/15$." Other values may be used for the control parameters, and in some implementations the control parameters may be adjustable, for example via user input to a user interface.

Eye-Level Alignment

The eye-level in a photo may be defined as a line connecting two vanishing points "$v_x$" and "$v_z$." Let "$v'_x$" and "$v'_z$" be the transformed vanishing points:

$$v'_x = \frac{Hv_x}{e_z^T Hv_x} \text{ and } v'_z = \frac{Hv_z}{e_z^T Hv_z}.$$

An objective relating to human perception may be to make the eye-level horizontal. In at least some implementations, the energy term may be defined as:

$$E_{eye} = \left(\sum_i w_i + \sum_j w_j\right)(e_y^T d_e)^2, \quad (A6)$$

where $d_e = (v'_z - v'_x)/\|v'_z - v'_x\|$, and "$w_i$" and "$w_j$" are weights used in Equation (A4). Since eye-level alignment may be enforced even when a photo contains many vanishing lines, such implementations may weight "$E_{eye}$" by a sum of line weights to properly scale "$E_{eye}$" with respect to "$E_{pic}$."

Perspective Distortion

Figure 5:
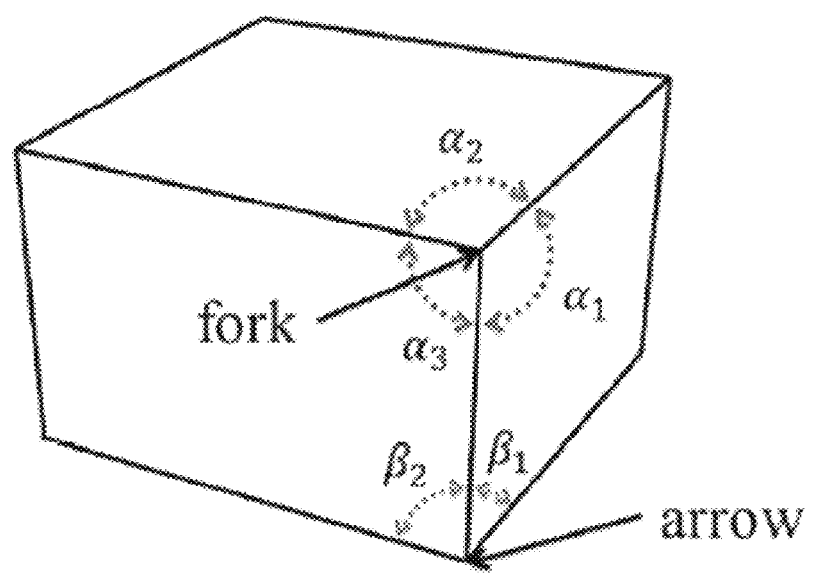
FIG. 5 illustrates Perkin's law.

Perspective distortion of a cuboid can be measured using Perkins's law, as illustrated in FIG. 5. According to Perkins's law, vertices of a cube may be divided into two categories; fork and arrow junctures. For a fork juncture, "$a_1$," "$a_2$," and "$a_3$" are defined to be greater than "$\pi/2$." For an arrow juncture, both "$\beta_1$" and "$\beta_2$" are defined to be less than "$\pi/2$," and the sum of the two angles is defined to be greater than "$\pi/2$." Vertices that violate the above conditions will not be perceived as vertices of a cube to the viewer.

Figure 6A:
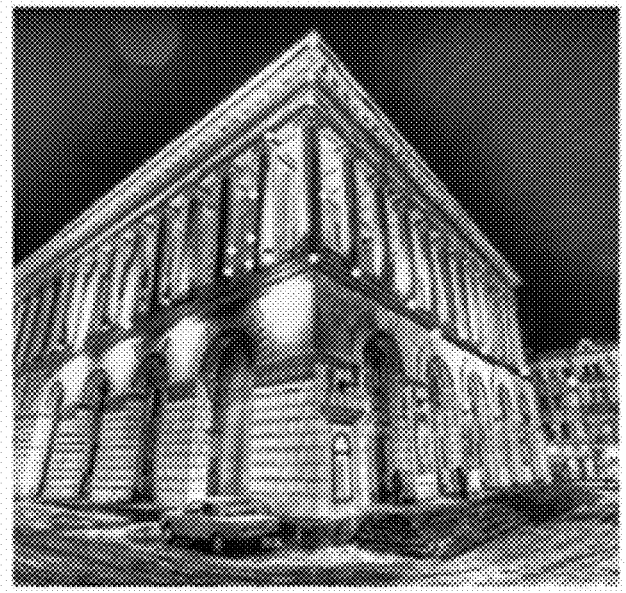
FIGS. 6A and 6B illustrate results of a corner point extraction technique, according to at least some implementations.
Figure 6B:

To apply Perkin's law, at least some implementations may detect corner points that are located on vertices of a cuboid. First, points are extracted where the start or end points of vanishing lines from two or three different axes meet. A mean-shift algorithm (or alternatively some other technique) may then be applied to those points to remove duplicated or nearby points. In at least some implementations, corner points with corner angles that are too small may also be removed. FIGS. 6A and 6B illustrate results of this corner point extraction technique, according to at least some implementations. Extracted points are marked as dots.

The extracted corner points may be used to measure perspective distortion under Perkins's law. For each corner point, three lines are drawn connecting the corner point to the three vanishing points. Angles between the three lines are then measured to see if Perkins's law is violated or not:

$$\forall c_i, \min(\alpha_{i_1}, \alpha_{i_2}, \alpha_{i_3}) > \frac{\pi}{2} \quad (A7)$$

where "$c_i$" represents a corner point. At least some implementations consider fork junctures solely, since arrow junctures can be transformed to fork junctures by swapping the direction of an edge.

Image Distortion

In at least some implementations, circles and other features in the input image may be detected to accurately measure image distortion. However, accurately detecting these features may be difficult. Thus, at least some implementations may instead use an approximation as described below.

First, low-level image edges may be detected, for example using a Canny detector. Then, edge pixels that are nearby straight lines may be removed. Assuming the remaining edge pixels are from curved lines that could be originated from some features (see FIGS. 7A and 7B), distortions of these pixels may be measured, for example using the following Jacobian measure:

$$E_{reg} = \lambda_r \sum_i \left\{\det\left(J\left(\frac{Hp_i}{e_z^T Hp_i}\right)\right) - 1\right\}^2,$$

where "$p_i$" is a remaining edge pixel, "$J(\bullet)$" is the Jacobian matrix, and "$\det(\bullet)$" is the determinant Jacobian matrix of a pixel "p" may be discreetly computed. For example, let "q" and "r" be two neighbor pixels of "p," so that "$p=(x,y)^T$," "$q=(x+1, y)^T$" and "$r=(x,y+1)^T$." Then the Jacobian matrix of "p" under a homography "H" is approximated as:

$$J(p) = \begin{bmatrix} \left(\frac{Hq}{e_z^T Hq} - \frac{Hp}{e_z^T Hp}\right)^T \\ \left(\frac{Hr}{e_z^T Hr} - \frac{Hp}{e_z^T Hp}\right)^T \end{bmatrix}$$

Figure 7A:
FIGS. 7A and 7B illustrate detecting curved edge pixels, according to at least some implementations.
Figure 7B:
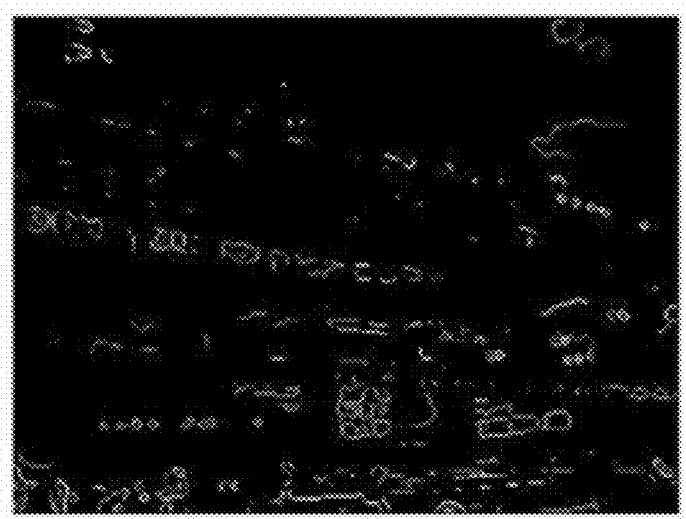

This energy increases when non-rigid transforms are applied to the pixels causing distortions of features. For "$\lambda_r$," at least some implementations may use a small value (e.g., $10^{-4}$). FIG. 7A shows an example original image, and FIG. 7B shows an example of detected curved edge pixels in which some features may be detected, such as human heads and letters.

Focal Length Difference

In at least some implementations, a reprojection model for a homography may be used that allows different focal lengths along the "x" and "y" axes for more natural results. However, for purposes of human perception the two lengths are not to differ by too much. To enforce this property, the following energy may be defined:

$$E_{focal} = \lambda_f (f_{1x} - f_{1y})^2,$$

In at least some implementations:

$$\lambda_f = (4/f)^2.$$

Energy Function Minimization

In at least some implementations, the energy function that may be minimized for upright adjustment becomes by combining each of the energy terms above:

$$\underset{H}{\operatorname{argmin}} E_{pic} + E_{eye} + E_{reg} + E_{focal} \quad (A8)$$

The above expression is subject to equation sixteen above that relates to Perkin's law. Accordingly, there are nine unknowns to be optimized: "$K_1$," "$R_1$," and "$t_1$" that include the values "$f_{1x}$", "$f_{1y}$", "$u_1$", "$v_1$", "$\Psi_1$", "$\theta_1$", "$t_x$" and "$t_y$" as defined above. However, "$u_1$" and "$v_1$" simply shift the resulting image after the transformation, and thus "$u_1 = u_0$" and "$v_1 = v_0$". Thus, equation three above may be optimized with respect to seven parameters. To initialize the variables, at least some implementations may use the following:

$$f_{1x} = f_{1y} = f, \Psi_1 = 0, \theta_1 = 0, \phi_1 = -\phi, \text{ and } tx = ty = 0,$$

where f and φ are values that may, for example, be obtained by camera calibration.

Note that this energy function is non-linear and is not solvable in a closed form. In at least some implementations, a numerical technique, for example using "fmincon" in Matlab or a similar function, may be used to minimize the energy function. Although global optimum is not guaranteed, this approach works well in practice. Note that other implementations may use other techniques to minimize the energy function.

Homography Optimization Parameters

In at least some implementations, the parameters for homography optimization described above may be adjusted to fulfill the user's intention. For example, relaxing the eye-level constraint may not be recommended, because this criterion is enforced to obtain a perceptually better result. However, a user may wish to control the effect of picture frame alignment by manipulating "$\sigma_v$," and "$\sigma_{h3}$," to avoid too aggressive adjustments. Thus, at least some implementations may provide a technique, for example via a user interface via which the user may adjust one or more homography optimization parameters.

Effects of Upright Adjustment Criteria

Figure 8A:
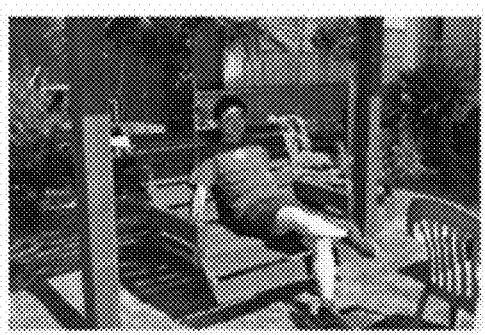
FIGS. 8A through 8C illustrate adjustment of a photo with large camera rotations, according to at least some implementations.
Figure 8B:
Figure 8C:
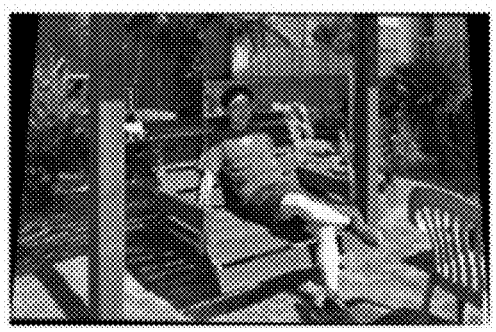

FIGS. 8A through 8C illustrate adjustment of a photo with large camera rotations, according to at least some implementations. FIG. 8A shows an original image, FIG. 8B shows the image as conventionally rectified, and FIG. 8C shows results of application of an implementation of the techniques described herein. Picture frame alignment may be desirable for photos of big planar objects, such as facades of buildings and billboards. However, its effect may diminish as the rotation angles of the camera increase, otherwise it may lead to undesirable distortion (see, e.g., FIG. 8B). Note that if picture frame alignment dominates other criteria, the adjustment result becomes similar to simple image rectification. At least some implementations may automatically handle this problem with an adaptive weight scheme (Equation (A5)) as well as the perspective and image distortion criteria, generating a better result as shown in FIG. 8C.

Figure 9C:
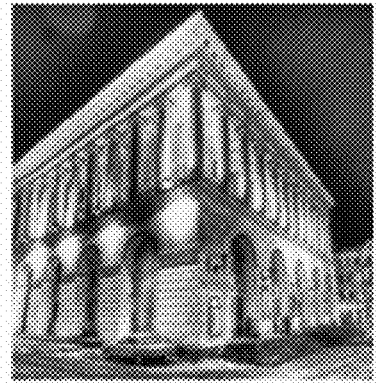

FIGS. 9A through 9C illustrate perspective distortion control, according to at least some implementations. FIG. 9A shows an original image. FIG. 9B shows a resulting image generated by adjusting the image of FIG. 9A without a perspective distortion constraint. FIG. 9C shows a resulting image generated by adjusting the image of FIG. 9A without a perspective distortion constraint, according to at least some implementations. Eye-level alignment may become increasingly desirable as the effect of picture frame alignment gets weaker (see, e.g., FIG. 1(d)), although applying this criterion may help to obtain a better result. Perspective distortion control prevents too strong adjustment that could make objects in the image appear distorted (see, e.g., FIGS. 9B and 9C). In at least some implementations, the focal lengths in the "x" and "y" directions may be allowed to slightly deviate with Equation (A3), resulting in a small aspect ratio change, to ease the perspective distortion.

Camera Calibration Techniques

In this section, a variety of different optimization-based technique for camera calibration are described that may, for example, be used to estimate the matrices "K" and "R" in Equation (A2), in at least some implementations of the automatic upright adjustment technique. Accordingly, a first example of one such technique is described, which is then followed by another example.

First Camera Calibration Example

In at least some conventional calibration techniques, Manhattan directions "M" are first determined using vanishing lines and vanishing points detected from the input photo, and then "K" and "R" are directly obtained from "M." However, in determining "M," corresponding vanishing points for the "x", "y", and "z" axes may not be obvious because there could be many vanishing points, possibly with position errors. The inaccuracy of "M" is then immediately propagated to "K" and "R" in such instances.

In contrast, implementations of the camera calibration technique described herein may estimate "K," "R," and "M" in conjunction with each other (i.e., "simultaneously"), for example using a maximum a posteriori (MAP) approach, which may produce results with increased reliability in comparison with these conventional techniques.

While the camera calibration technique is described as being used in at least some implementations of the automatic upright adjustment technique to estimate camera parameters and vanishing points and lines for an input image, note that the technique may be applied in other digital image processing techniques and techniques than those described herein to estimate camera parameters and/or vanishing points and lines for an input image.

Line Segment Detection

Line segments are basic primitives in implementations of the calibration technique. From the input image, a set of line segments "L" may be extracted, for example using a technique in a multi-scale fashion. For each line segment "$l_i$," its two end points "$p_i$" and "$q_i$" may be stored.

Calibration Formulation

In at least some implementations, the joint probability of Manhattan directions "M," intrinsic matrix "K," and orientation matrix "R" with respect to line segments L can be expressed as follows:

$$p(K,R,M|L) \propto p(L|K,R,M)p(K,R,M) = p(L|M)p(M|K,R)p(K)p(R), \quad (A9)$$

with assumptions that "K" and "R" are independent of each other and also independent of "L." By taking log probability, Equation (A9) may be rephrased into an energy function as:

$$E_{K,R,M|L} = E_K + E_R + E_{M|K,R} + E_{L|M}. \quad (A10)$$

Prior $E_K$

To define the prior for "K," at least some implementations may assume that the center of projection "$c_p=(u_0, v_0)$" is the image center "$c_1=(c_x, c_y)$," and that the focal length "f" is the image width "W." "$E_K$" may then be defined as:

$$E_K = \lambda_f \left(\frac{\max(W, f)}{\min(W, f)} - 1\right)^2 + \lambda_c \|c_p - c_I\|^2.$$

At least some implementations may set "$\lambda_f$ as 0.04" and "$\lambda_c$ as $(10/W)^2$." However, other values may be used in other implementations as further described below.

Prior $E_r$

For the prior of "R," at least some implementations may assume that the orientation of the camera is aligned with the principal axes of the world, which is a reasonable assumption in most cases. In at least some implementations:

$$E_R = \lambda_\psi \psi^2 + \lambda_\theta \theta^2 + \lambda_\phi \phi^2.$$

In at least some implementations, the three rotation angles are not weighted equally. Particularly, it can be found that the prior for $\phi$ (z-axis rotation) should be stronger to enforce eye-level alignment. Thus, at least some implementations may use:

$$[\lambda_\psi, \lambda_\theta, \lambda_\phi] = [4/\pi, 3/\pi, 6/\pi]^2.$$

Posterior $E_{M|K,R}$

In at least some implementations, if "K" and "R" are known, "M" can be estimated as:

$$M = [v_x v_y v_z] = (KR)I_3,$$

where "$I_3 = [e_x \ e_y \ e_z]$" is the identify matrix. In at least some implementations, using this property, an energy function may be formulated as follows:

$$E_{M|K,R} = \lambda_M \sum_{i \in \{x,y,z\}} \left[\cos^{-1}\left\{e_i^T \frac{(KR)^{-1}v_i}{\|(KR)^{-1}v_i\|}\right\}\right]^2.$$

This energy function covers the orthogonality of Manhattan directions and the prior for zenith. In at least some implementations, "$\lambda_M$" may be set as "$(24/\pi)^2$." However, other values for "$\lambda_M$" may be used in some implementations.

Posterior $E_{L|M}$

This term measures the conformity of detected line segments to the estimated vanishing points. In at least some implementations, vanishing points for which more line segments could be parts of vanishing lines may be desirable. In at least some implementations, the energy function is:

$$E_{L|M} = \lambda_L \sum_i \min\{d(v_x, l_i), d(v_y, l_i), d(v_y, l_i)\},$$

where "d(•)" is the distance between a vanishing point and a line. At least some implementations may use the following distance definition:

$$d(v, l) = \min\left(\frac{|r^T p|}{\sqrt{r_1^2 + r_2^2}}, \delta\right), \quad (A11)$$

where "p" and "q" are two end points of "l" and $$r = \left(\frac{p+q}{2}\right) \times v = [r_1 \ r_2 \ r_3]T.$$

"$\delta$" is the given maximum error value. In at least some implementations, "$\delta$" may be 1.75. In at least some implementations, "$\lambda_L$" may be set to 0.02. However, note that other values may be used for "$\delta$" and/or "$\lambda_L$" in some implementations.

Dealing with Missing Vanishing Points

When "M" is estimated, all three vanishing points may not be found in some cases. In at least some implementations, for robustness, the energy terms "$E_{M|K,R}$" and "$E_{L|M}$" may be able to handle this case. In at least some implementations, for "$E_{M|K,R}$" the energy may be set to zero for a missing vanishing point, assuming that the point is located at the position estimated using "K" and "R." In at least some implementations, for "$E_{L|M}$, $d(v_{miss}, l_i)$, is $\delta$ for $l_i$."

Iterative Optimization of K, R, and M

With the energy terms defined above, directly optimizing Equation (A10) may be difficult since it is highly non-linear. Therefore, at least some implementations may use an iterative technique to find an approximate solution.

In at least some implementations, in the iterative technique, the technique may alternately optimize "K", "R," and "M." In at least some implementations, by fixing "M," Equation (A10) can be optimized with "K" and "R" by:

$$\underset{K,R}{\mathrm{argmin}} E_K + E_R + E_{M|K,R}. \quad (A12)$$

Similarly, in at least some implementations, optimization of "M" can be achieved by solving:

$$\underset{M}{\operatorname{argmin}} E_{M|K,R} + E_{L|M}. \qquad (A13)$$

To optimize "K" and "R" given "M," at least some implementations may use "fminsearch" in Matlab or a similar function, or some other optimization technique. However, optimization of "M" may still be difficult even if "K" and "R" are fixed, since "$E_{L|M}$" truncates distances to "δ" as defined in Equation (A11). To solve Equation (A13), at least some implementations may use a discrete approximation.

In at least some implementations, from the line segments "L," a large set of vanishing points "V=[$v_1, v_2, \ldots, v_n$]" may be hypothesized, where each element is computed as the intersection point of two randomly selected lines. Optimizing "M" thus becomes selecting vanishing points from "V" to minimize the energy in Equation (A13). For each element of "M=[$v_x, v_y, v_z$]," a vanishing point in "V" is found that minimizes the energy while retaining the other two elements.

In at least some implementations, a small subset "$V_c = \{V_{c1}, V_{c2}, \ldots, V_{ck}\}$" may be selected from "V" that is the "closest to all lines" in the following way:

$$\underset{\{v_{c_1},\ldots,v_{c_k}\}}{\operatorname{argmin}} \sum_i \min\{d(v_{c_1}, l_i), \ldots, d(v_{c_k}, l_i)\},$$

where "k=9" in at least some implementations. In at least some implementations, a special vanishing point "$v_{miss}$," representing a missing vanishing point, may be added into "$V_c$" because "$V_c$" may not contain each of the Manhattan directions of the scene. For each triplet of vanishing points in "$V_c$," at least some implementations may optimize "K," "R," and "M" using Equations (A12) and (A13), and then evaluate Equation (A10). Finally, "K," "R," and "M" with the minimum energy may be used as the calibration results.

In at least some implementations, although initial "$V_c$" may not contain each of the Manhattan directions, the missing directions can be detected from "V" while optimizing Equation (A13) in the iterative optimization process. However, optimizing "K," "R," and "M" for each of the possible triplets in "$V_c$" may be computationally expensive. Thus, at least some implementations may use one or more early termination strategies for speedup as described in further detail below.

Grouping Vanishing Lines

After the calibration process, at least some implementations may determine the vanishing lines for each vanishing point in "M." Three sets of vanishing lines, "$L_x$," "$L_y$," and "$L_z$," may be obtained from "L" by:

$$L_i = \{l \in L | d(v_i, l) < \delta\}, i \in \{x, y, z\},$$

where "d(•)" is the distance function defined in Equation (A11). Examples of camera calibration results with estimated vanishing lines are shown in FIGS. 10A-10D.

Camera Calibration Parameters

In some implementations, the values of the parameters for camera calibration may be fixed. However, in other implementations, the values may be specified. Values for these parameters may, for example, be determined experimentally. "δ" is related to the tolerance of noise in line segment positions. If "δ" is set too small or too large, the algorithm may not find optimal vanishing points since line segments could be grouped less accurately. "δ" is also related to "$\lambda_L$," since the energy function "$E_{L|M}$" is related to the distances between lines and vanishing points which are truncated to "δ". Generally, "$\lambda_L$" is decreased as "δ" is increased, otherwise the calibration result may depend on "$E_{L|M}$" to an excessive amount.

Decreasing "φ," "n," and "$k_c$" may speed up the computation, at the cost of less accurate estimation. In addition, using bigger values for these parameters may not improve the estimation results. Similar to many other camera calibration techniques, implementations of the calibration technique are randomized and occasionally may obtain undesirable results. However, with the priors on "K" and "R" and simultaneous optimization of "K," "R," and "M", stable results may be realized in most cases. At least some implementations may provide a technique, for example via a user interface, via which the user may adjust one or more camera calibration parameters.

Camera Calibration Initialization

The following recaps the camera calibration technique, and describes initialization details for the technique. An objective is to estimate camera intrinsic parameter matrix "K" and orientation "R," as well as Manhattan direction "M" from a single image. In at least some implementations, this may be done by minimizing the following energy function:

$$E_{K,R,M|L} = E_K + E_R + E_{M|K,R} + E_{L|M}. \qquad (B1)$$

(Note that this energy function is also shown as Equation (A10)). At least some implementations may use an alternating optimization scheme to optimize "K," "R," and "M". In some implementations, "M" is fixed to update "K" and "R" with the following equation:

$$\underset{K,R}{\operatorname{argmin}} E_K + E_R + E_{M|K,R}. \qquad (B2)$$

Then "M" is updated by fixing "K" and "R" as:

$$\underset{M}{\operatorname{argmin}} E_{M|K,R} + E_{L|M}. \qquad (B3)$$

This optimization process can optimize "K," "R," and "M" in conjunction with each other, i.e., "simultaneously." In at least some implementations, to determine initial values, a small subset "$\{v_{c1}, v_{c2}, \ldots, v_{ck}\}$" is selected from "V." Then three vanishing points are selected as initial "M" from "$V_c$" to evaluate Equation (B1).

In at least some implementations, based on the Manhattan assumption, "$V_c$" may be selected that can minimize "$E_{L|M}$" as follows:

$$\underset{\{v_{c_1},\ldots,v_{c_k}\}}{\operatorname{argmin}} \sum_{i=1}^n \min\{d(v_{c_1}, l_i), \ldots, d(v_{c_k}, l_i)\}, \qquad (B4)$$

where "n" is the number of line segments and "d(•)" is the distance function defined above. In at least some implementations, "k=9." For each triplet of vanishing points in "$V_c$," Equation (B1) may be evaluated by optimizing "K" and "R" with respect to the triplet. However, when vanishing points are selected, often some vanishing points may be missing, since there may be no vanishing point that represents a specific Manhattan direction (see, e.g., FIG. 10B).

In at least some implementations this may be modeled by adding a special vanishing point "$v_{miss}$," representing a missing vanishing point, into "$V_c$" so that "$V_c=\{v_{c1}, \ldots, v_{ck}, v_{miss}\}$." Then a triplet of vanishing points may be selected to build "M" from "$V_c$" as follows:

$$M=[v_x, v_y, v_z]$$

$$1 \leq x, y, z \leq k+1$$

$$x \neq y \neq z \text{ if } x, y, z \leq k,$$

where "$v_x$," "$v_y$," and "$v_z$" are "x," "y," and "z"-th elements of "$V_c$." With this representation, "M" can be built including missing vanishing points.

Once the initial "M" is built "K," "R" and "M" can be optimized. However, optimizing for each of the possible triplets may involve a large amount of computation, and thus in at least some implementations the following strategy may be used. For each triplet, "K" and "R" are optimized using Equation (B2). Then Equation (B1) is evaluated without any further optimization of "M." Each of the triplets are sorted by their evaluated energy values, and then several triplets are selected as inputs to the iterative optimization. In at least some implementations, triplets may be selected whose energy values are less than twice of the minimum amount all triplets.

Figure 10A:
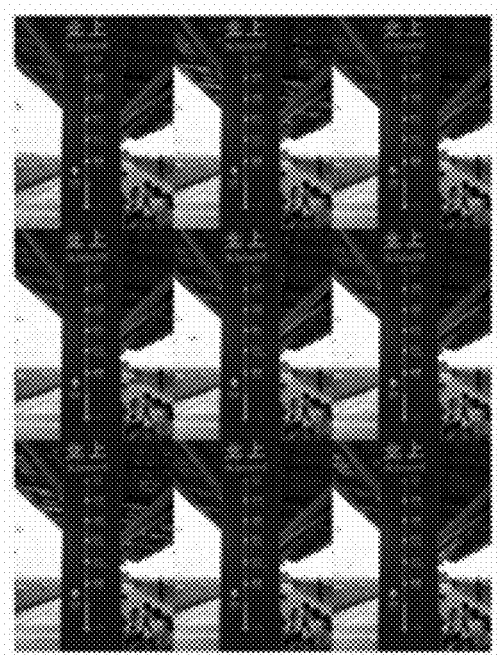
FIGS. 10A through 10D illustrate the process of the camera calibration technique, according to at least some implementations.
Figure 10B:
Figure 10C:
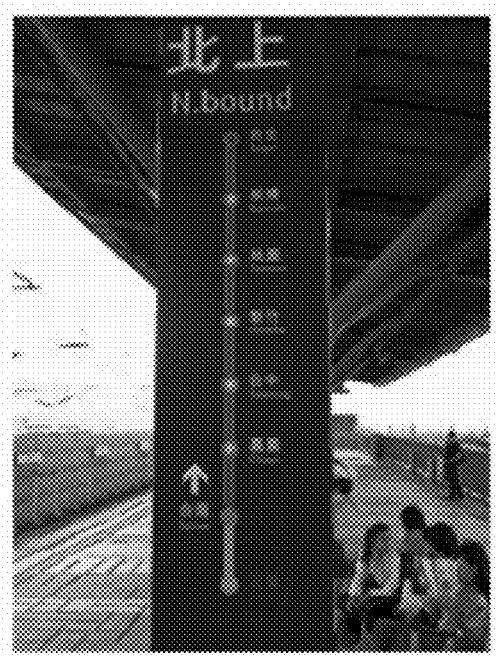
Figure 10D:
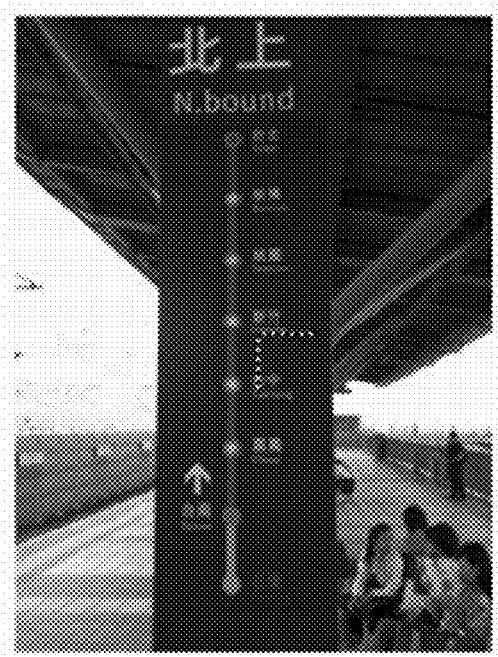

FIGS. 10A through 10D illustrate the process of the camera calibration technique, according to at least some implementations. The technique can effectively find Manhattan directions and estimate camera parameters at the same time. FIG. 10A shows an input image. In FIG. 10B, Manhattan direction along the x-axis is not estimated well since "$V_c$" does not have a proper corresponding vanishing point. This problem is handled during the iterative optimization step; in FIG. 10C, the correct M is estimated. In FIG. 10D, the origin of the two axes shown by the dotted lines indicates the center of projection.

Second Camera Calibration Example

As described above, calibration of camera parameters from a single image is a highly ill-posed problem. Several priors were utilized in previous approaches, such as the Manhattan world assumption. In this section, a set of calibration priors are first described, a calibration technique is then formulated as a maximum a-posteriori (MAP) estimation, and an optimization algorithm is then described.

Scene Priors

Manhattan world assumption is the most common prior in single image camera calibration methods. It assumes the existence of three dominant orthogonal directions in the scene, which are called "Manhattan directions" as shown in FIG. 22C. By extracting those directions, the reference world coordinate axes can be recovered and the camera parameters can be calibrated.

Despite of the effectiveness of the Manhattan world model, in some cases a scene can have multiple orthogonal directions that do not align, such as two groups of buildings with a non-right angle between their horizontal directions (e.g., see FIG. 22C), which may be referred to as "Atlanta" world assumptions. In this example, a similar prior is employed in which an Atlanta world assumption is made. For example, the assumption may specify that an input image has a dominant orthogonal frame, with additional horizontal directions sharing the same vertical direction.

Camera Priors

Some techniques utilize priors on the intrinsic parameter matrix "K" of the camera. The assumption is that the focal length in pixel dimension of the camera is the same as the width of the image and the center of projection is the image center, so that:

$$K = \begin{pmatrix} f & 0 & u_0 \\ 0 & f & v_0 \\ 0 & 0 & 1 \end{pmatrix} \sim \begin{pmatrix} W & 0 & c_x \\ 0 & W & c_y \\ 0 & 0 & 1 \end{pmatrix}$$

where "W" is the image width and "$(c_x, c_y)$" is the image center, respectively.

For the prior on external camera orientation "R," the human tendency that people tend to align their camera with the principal axes of the world is adopted. Under this assumption, rotation angles of the orientation matrix "R" are small so that:

$$\{\psi, \theta, \phi\} \sim 0 \text{ where } R = R_\psi R_\theta R_\phi$$

Calibration Formulation

As before, line segments are used as the basic primitives for calibration. Form the input image, a set of line segments "L" is extracted in a multi-scale fashion. Each line segment "$l_i$" is stored with its two end points "$p_i$" and "$q_i$" in the projective plant "$P^2$".

Once line segments are extracted, camera parameters "K" and "R" are calibrated. To utilize the calibration priors, Manhattan directions "M" and additional horizontal vanishing points "A" are extracted during calibration, where:

$$M=[v_x, v_y, v_z] \text{ and } A=[v_{\alpha_1} v_{\alpha_2} \ldots v_{\alpha_k}].$$

and "v" representing a vanishing point in "$P^2$". The joint probability of "K," "R," "M," and "A" with respect to "L" may be formatted as follows:

$$p(K,R,M,A|L) \propto p(L|K,R,M,A)p(K,R,M,A) = p(L|M,A)p(M,A|K,R)p(R)$$

with the assumption that "K" and "R" are independent of each other and also independent of "L". By taking a log, the above expression may be converted into the following energy function:

$$E_{K,R,M,A|L} = E_K + E_R + E_{M,A|K,R} + E_{L|M,A}$$

For the computation of "$E_{L|M,A}$" the scene priors are used. Under the Manhattan word assumption, triplets of vanishing points that represent more line segments are desirable. Furthermore, for the union of "M" and "A", it may be desirable to have as many as possible line segments as vanishing lines. Accordingly, the energy function may be formulated as follows:

$$E_{L|M,A} = \lambda_{L_m} \sum_i d_m(M, l_i) + \lambda_{L_a} \sum_i d_m(M \cup A, l_i)$$

where "$l_i$" represents a line segment. The value "$d_m(\cdot)$" is used to measure the minimum distance between a set of vanishing points "$V=\{v_1, v_2, \ldots, v_k\}$" and a line segment "l" as follows:

$$d_m(V,l) = \min\{d(v_1,l), d(v_2,l), \ldots, d(v_k,l)\}$$

The value "$d((\cdot))$" is used for measuring a distance between a vanishing point and a line using the following definition:

$$d(v, l) = \min\left(\frac{|r^T p|}{\sqrt{r_1^2 + r_2^2}}, \delta\right)$$

where "p" and "q" are two end points of "l" and $$r = \left(\frac{p+q}{2}\right) \times v = [r_1 \ r_2 \ r_3]^T$$

The value "$\delta$" represents a given maximum error value, which was 1.75 in an example. The values "$\lambda_{Lm}$" and "$\lambda_{La}$" were set to 0.01 and 0.02, respectively, in this example although other examples are also contemplated.

The values "$E_K$" and "$E_R$" are related to camera priors. From the intrinsic parameter matrix "K" and "R", the following expressions may be obtained:

$$E_K = \lambda_f \left(\frac{\max(W, f)}{\min(W, f)} - 1\right)^2 + \lambda_c \|c_p - c_I\|^2$$

and $$E_R = \lambda_\psi \psi^2 + \lambda_\theta \theta^2 + \lambda_\phi \phi^2$$

For "$E_K$", the value "$\lambda_f$" is set as 0.004 and "$\lambda_C$" is set as "$(4/W)^2$." For "$E_R$", the three rotation angles are not weighted equality. Particularly, it was found that it may be beneficial for the prior for "$\phi$" (i.e., z-axis rotation) to be stronger for enforce eye-level alignment. Thus, the following expression may be utilized:

$$[\lambda_\psi, \lambda_\theta, \lambda_\phi] = [3/\pi, 2/\pi, 6/\pi]^2$$

To compute "$E_{M,A|K,R}$", it is assumed that "$E_{M|K,R}$" and "$E_{A|K,R}$" may be computed independently so that:

$$E_{M,A|K,R} = E_{M|K,R} + E_{A|K,R}.$$

Then, if "K" and "R" are known "M" may be estimated as:

$$M = [v_x, v_y, v_z] = (KR)I_3$$

where "$I_3 = [e_x \ e_y \ e_z]$" is the identity matrix. Using this property, "$E_{M|K,R}$" may be formulated as follows:

$$E_{M|K,R} = \lambda_M \sum_{i \in \{x,y,z\}} \left[\cos^{-1}\left\{e_i^T \frac{(KR)^{-1} v_i}{\|(KR)^{-1} v_i\|}\right\}\right]^2$$

where "$\lambda_m$" is set as "$(48/\pi)^2$" in one or more examples. The value "A" represents horizontal directions and thus is to be perpendicular to "$e_y$". Thus, "$E_{A|K,R}$" may be formulated as follows:

$$E_{A|K,R} = \lambda_A \sum_i \left[\cos^{-1}\left\{e_y^T \frac{(KR)^{-1} v_{a_i}}{\|(KR)^{-1} v_{a_i}\|}\right\} - \frac{\pi}{2}\right]^2$$

where "$v_{ai}$" represents a horizontal vanishing point and "$\lambda_A$" is set as "$(48/\pi)^2$" in one or more examples.

Missing Vanishing Points

An iterative approach may be used to find a solution using the energy terms defined above. In the iterative, the values "K" and "R", "M", and "A" are optimized in an alternating manner. If "M" and "A" are fixed, the energy function above for "$E_{M,A|K,R}$" may be optimized with respect to "K" and R" by the following:

$$\underset{K,R}{\operatorname{argmin}} E_K + E_R + E_{M,A|K,R}$$

Similarly, optimization of "M" and "A" may be achieved by solving the following expressions:

$$\underset{M}{\operatorname{argmin}} E_{M,A|K,R} + E_{L|M,A},$$

$$\underset{A}{\operatorname{argmin}} E_{M,A|K,R} + E_{L|M,A}$$

while fixing other parameters.

For optimizing "K" and "R", at least some implementations may use "fminsearch" in Matlab or a similar function, or some other optimization technique. On the other hand, optimizations of "M" and "A" may still be difficult since "$E_{L|M,A}$" truncates distances to "$\delta$" as described above and the size of "A" is unknown.

To solve the above expressions, discrete approximation may be utilized. For example, from the line segments "L", a large set of vanishing points "$V = [v_1 \ v_2 \ \ldots \ v_n \ v_{miss}]$" may be hypothesized in which each element is computed as an intersection point of two randomly selected lines except for "$v_{miss}$" which represents the missing vanishing point. The value "n" may be set to "2000" in one or more examples. Optimizing "M" and "A" thus becomes selecting vanishing points from "V" to minimize energies in the above expressions.

To optimize "M," for each element of "$M = [v_x \ v_y \ v_z]$" a vanishing point in "V" is found that minimizes the energy while retaining the other two elements. For optimizing "A" a greedy approach may be used in which a vanishing point from "V" is selected one by one that minimizes the optimization expression for "A" above until energy does not decrease.

In order to make initial values of "M", a small subset of "$V_c \{v_c, v_{c2}, \ldots, v_{ck}\}$" are selected from "V" that is the "closest to all lines" in the following way:

$$\underset{\{v_{c_1}, \ldots, v_{c_k}\}}{\operatorname{argmin}} \sum_i \min\{d(v_{c_1}, l_i), \ldots, d(v_{c_k}, l_i)\}$$

where "k" is set equal to nine in one or more examples. The value "$v_{miss}$" is also added into "$V_c$" also.

For each triplet of vanishing point in "$V_c$", an initial "K" and "R" is optimized, "M" is set as the triplet, and "A" as empty. The initial "A" is then optimized. Each of the variables are then optimized using the above expressions and evaluated using the energy function above that takes a log of the joint probabilities above. Finally, values of "K", "R", "M", and "A" with the minimum energy are used as calibration results. Although initial "$V_c$" may not contain each of the Manhattan directions, the missing directions may be detected from "V" while optimizing "M" using the above expression as part of the iterative optimization process.

After the calibration process, the vanishing lines for each vanishing point in "M" are determined. Three pencils of vanishing lines, "$L_x$", "$L_y$", and "$L_z$" are obtained from "L" by:

$$L_i = \{l \in L \mid d(v_i, l) < \delta\}, i \in \{x, y, z\}$$

where "$d(\bullet)$" is the distance function as described above.

Utilizing External Information

The MAP formulation may be reformulated to various forms to utilize additional information provided by a user or camera manufacturer. For example, focal length or center of projection may be fixed if given. Additional horizontal vanishing points "A" may be detected but may be ignored if the scene strictly follows a Manhattan world assumption. In such a case, "$E_{L|M,A}$" and "$E_{M,A|K,R}$" become "$E_{L|M}$" and "$E_{M|K,R}$", respectively and the calibration may be performed without detection of additional horizontal vanishing points.

Comparison with Manual Correction

Figure 11A:
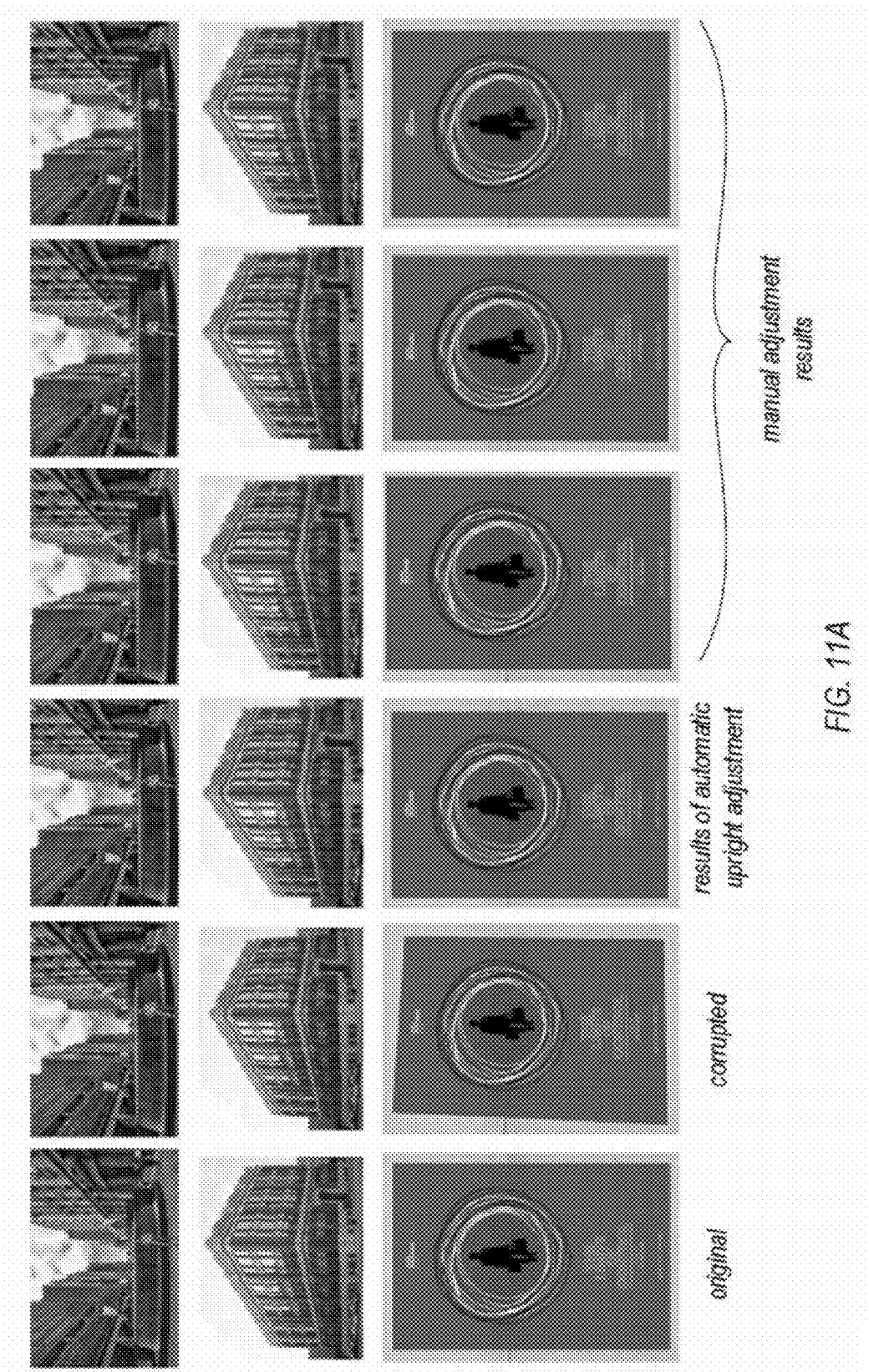
FIGS. 11A and 11B compare results of an implementation of the automatic upright adjustment technique with manually generated results.
Figure 11B:
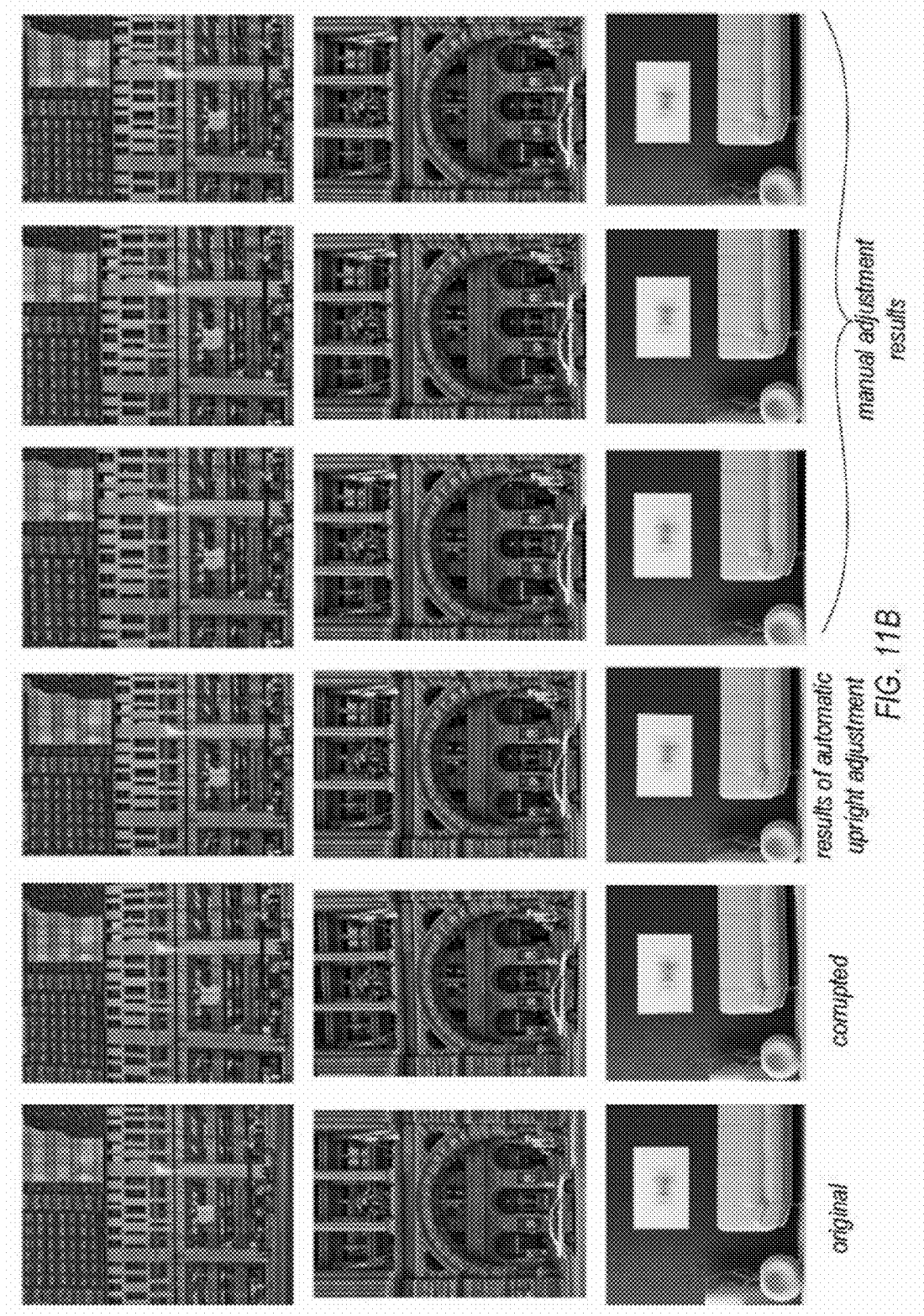

FIGS. 11A and 11B compare results of an implementation of the automatic upright adjustment technique with manually generated results. A set of original images that are aligned well were collected. Each image was rotated with an arbitrary rotation matrix to produce corrupted results. Several users manually adjusted the transformed photos using a lens correction tool of a digital image processing application. The same corrupted images were also transformed using an implementation of the automatic upright adjustment technique. FIGS. 11A and 11B show some of the results for comparison. It can be seen that the manual adjustment results are similar to the results generated by the automatic upright adjustment technique.

To confirm that automatic upright adjustment technique performs upright adjustment correctly, rotation angles computed by the technique were compared with the ground truth values. Since the original photos are already well taken, rotation angles computed by the technique should be similar to the ground truth values. The differences of rotation angles were found to be small.

Comparison with Tilt-Shift Lenses

Figure 12:
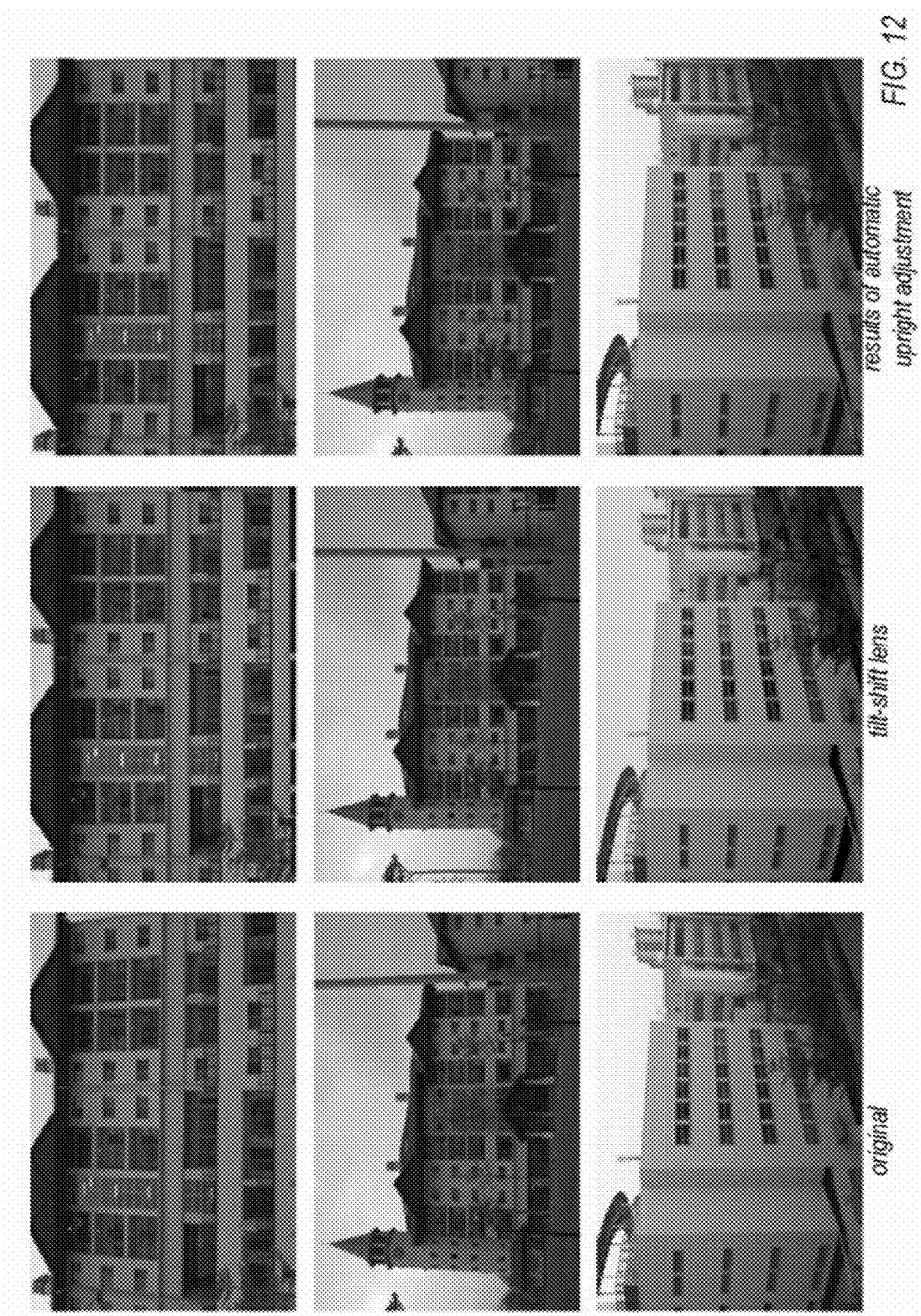
FIG. 12 compares results of an implementation of the automatic upright adjustment technique with images captured using a tilt-shift lens.

FIG. 12 compares results of an implementation of the automatic upright adjustment technique with images captured using a tilt-shift lens. Several pairs of photos were captured for the comparison. For each pair, a scene was first captured conventionally, and then a second image was captured using the shift functionality of the lens to take an upright version of the scene. The conventional photo was then adjusted using an implementation of the automatic upright adjustment technique and compared the result with the upright version from tilt-shift lens. FIG. 12 shows some example results. It can be seen that the results generated by the automatic upright adjustment technique are similar to the images captured using tilt-shift.

Example Results

Figure 14A:
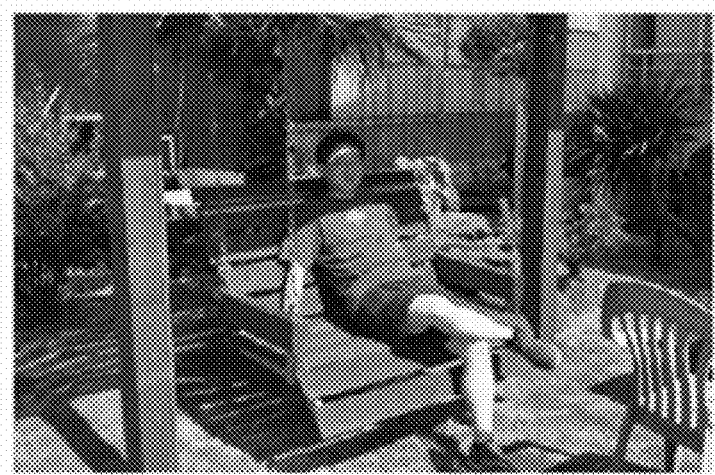
FIGS. 14A through 14C compare results of an implementation of the automatic upright adjustment technique to results of a conventional rectification technique.
Figure 14B:
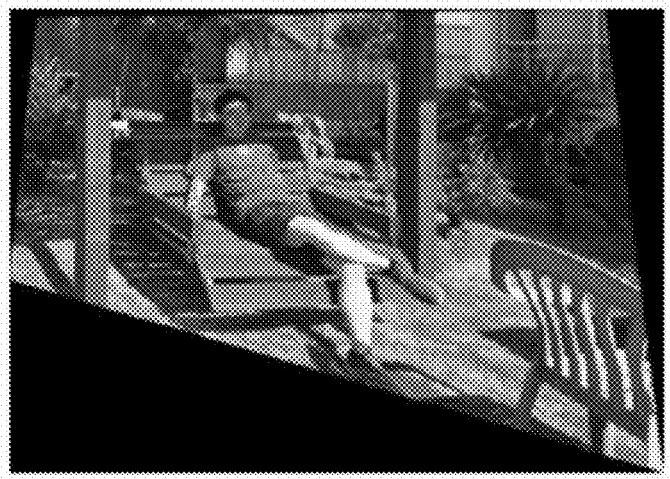
Figure 14C:
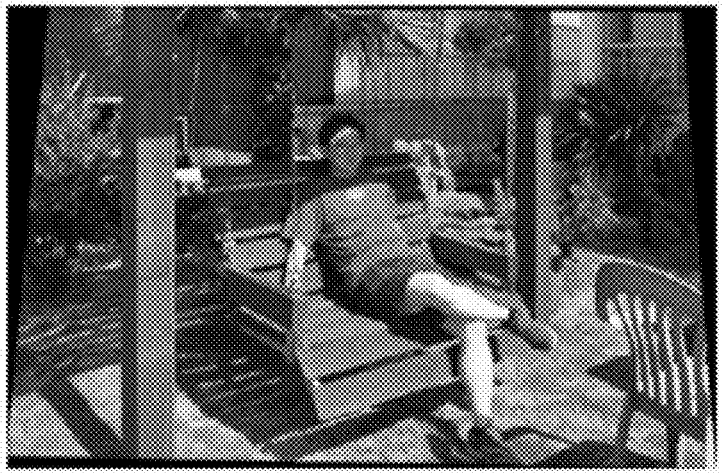

FIGS. 14A through 22B show additional results of the automatic upright adjustment technique, according to at least some implementations. FIG. 14A shows an original image of a scene of a human sitting in a porch swing. FIG. 14B shows results of a conventional rectification technique applied to the image of FIG. 14A. Note distortion in the image, particularly in the swing and the human figure. FIG. 14C shows results of the automatic upright adjustment technique applied to the image of FIG. 14A, according to at least some implementations. Note that there is little or no distortion of the swing and human figure when compared to FIG. 14B.

Figure 15A:
FIGS. 15A and 15B illustrate results of an implementation of the automatic upright adjustment technique.
Figure 15B:

FIG. 15A shows an original image of a scene of a human sitting in a kitchen. FIG. 15B shows results of the automatic upright adjustment technique applied to the image of FIG. 15A, according to at least some implementations. Note that foreground and background features have been adjusted, while there is little or no distortion of the human figure or other features.

Figure 16A:
FIGS. 16A and 16B illustrate results of an implementation of the automatic upright adjustment technique.
Figure 16B:

FIG. 16A shows an original image of a scene of the inside of an airplane. FIG. 16B shows results of the automatic upright adjustment technique applied to the image of FIG. 16A, according to at least some implementations.

Figure 17A:
FIGS. 17A and 17B illustrate results of an implementation of the automatic upright adjustment technique.
Figure 17B:
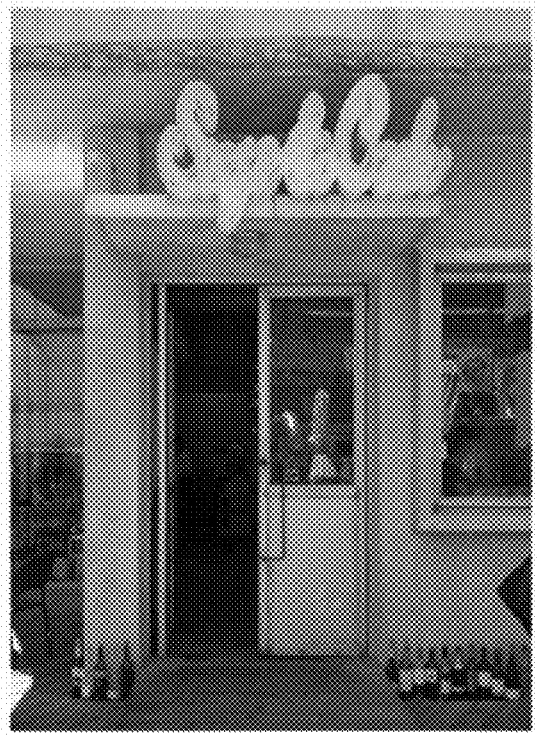

FIG. 17A shows an original image of a storefront scene. FIG. 17B shows results of the automatic upright adjustment technique applied to the image of FIG. 17A, according to at least some implementations.

Figure 18A:
FIGS. 18A and 18B illustrate results of an implementation of the automatic upright adjustment technique.
Figure 18B:

FIG. 18A shows an original image of a wall with plaques and pictures. FIG. 17B shows results of the automatic upright adjustment technique applied to the image of FIG. 18A, according to at least some implementations.

Figure 19A:
FIGS. 19A and 19B illustrate results of an implementation of the automatic upright adjustment technique.
Figure 19B:
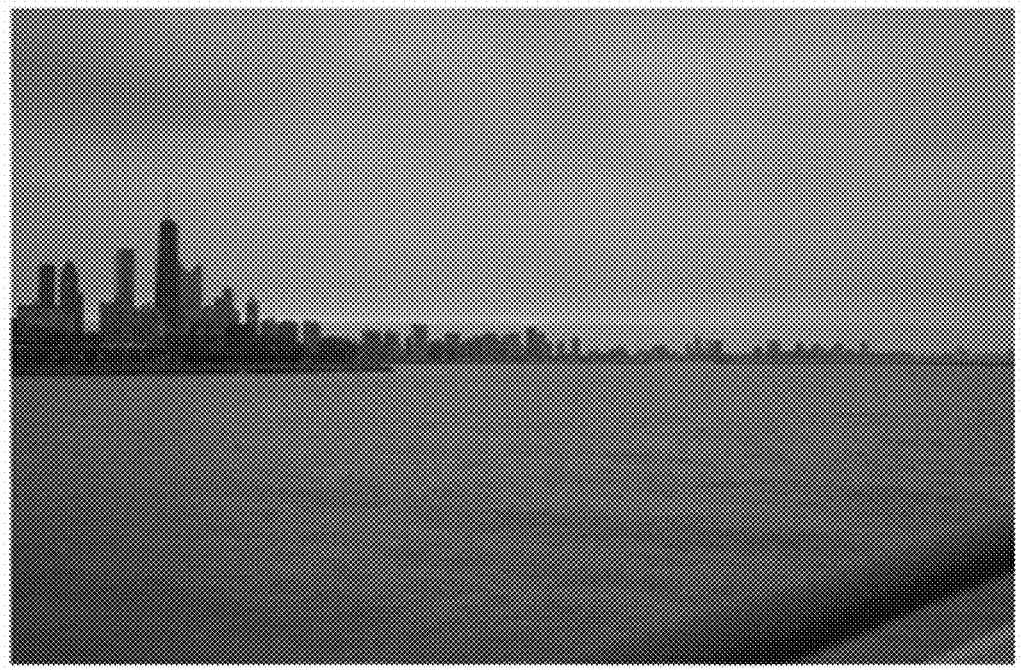

FIG. 19A shows an original image that contains an unaligned horizon. FIG. 19B shows results of the automatic upright adjustment technique applied to the image of FIG. 19A, according to at least some implementations.

Figure 20A:
FIGS. 20A and 20B illustrate results of an implementation of the automatic upright adjustment technique.
Figure 20B:

FIG. 20A shows an original image of a door. FIG. 20B shows results of the automatic upright adjustment technique applied to the image of FIG. 20A, according to at least some implementations.

Figure 21A:
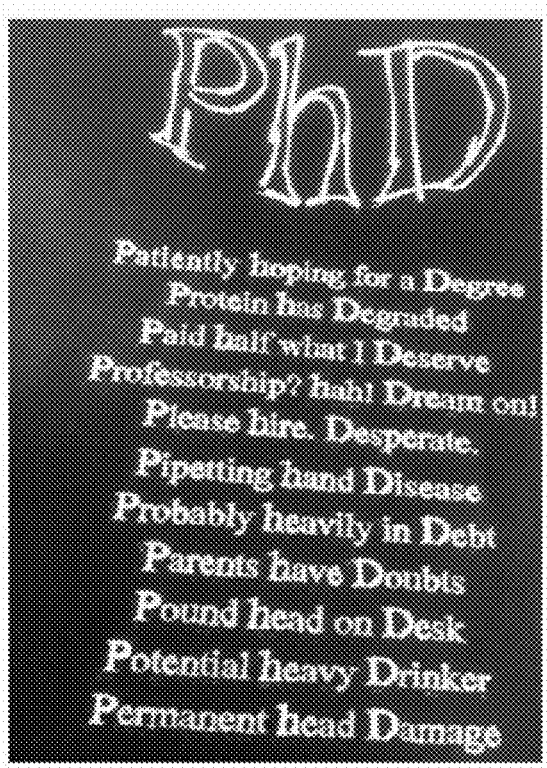
FIGS. 21A and 21B illustrate results of an implementation of the automatic upright adjustment technique.
Figure 21B:
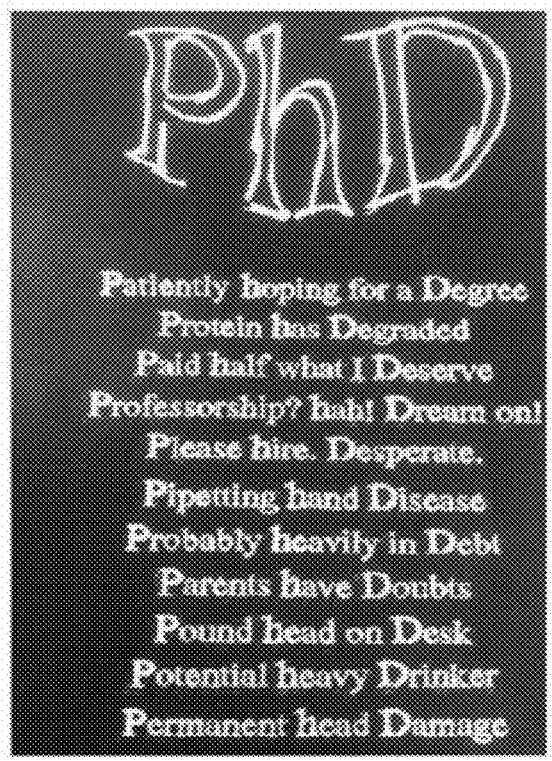

FIG. 21A shows an original image of a poster that includes writing. FIG. 21B shows results of the automatic upright adjustment technique applied to the image of FIG. 21A, according to at least some implementations.

Figure 22A:
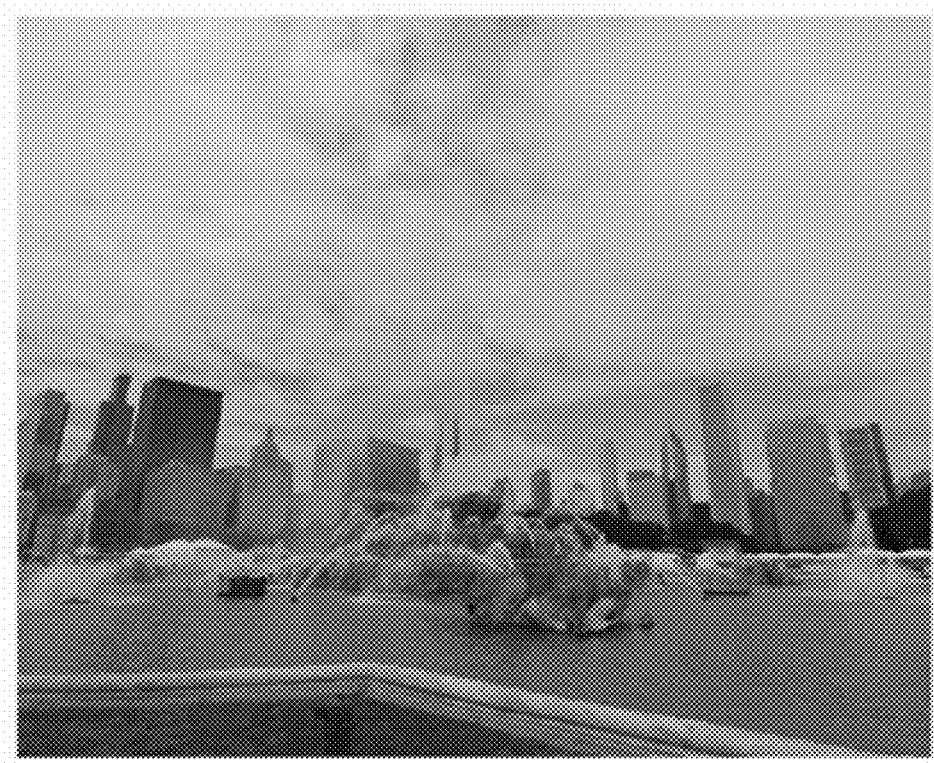
FIGS. 22A and 22B illustrate results of an implementation of the automatic upright adjustment technique.
Figure 22B:
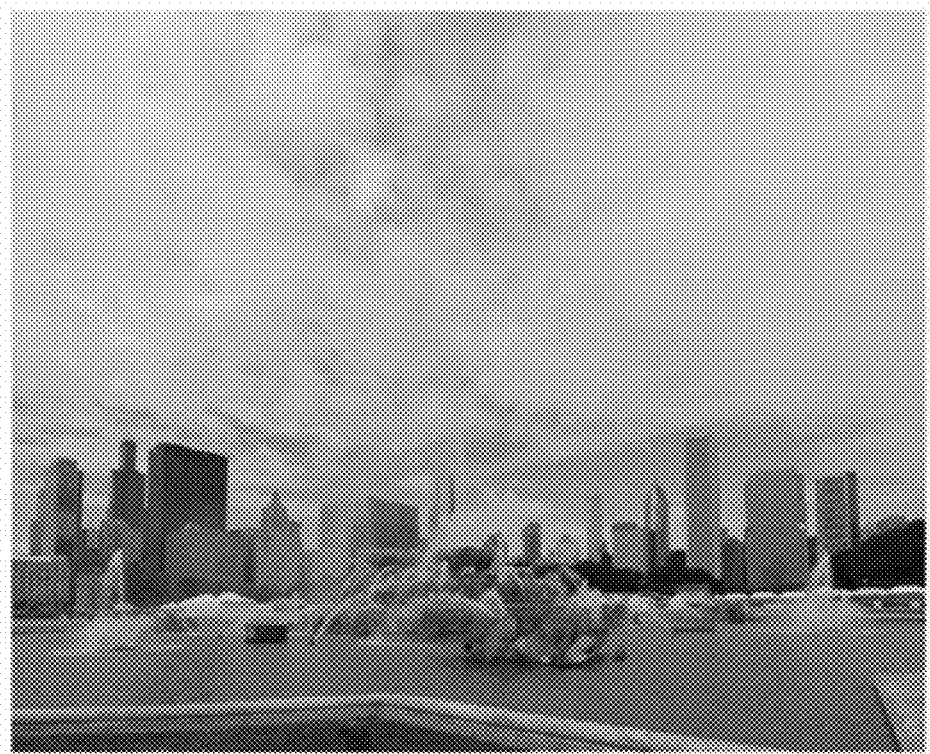
Figure 22C:
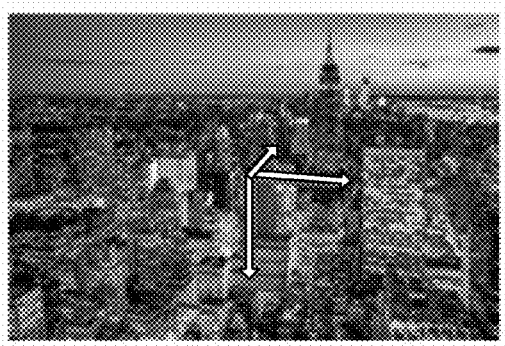
FIG. 22C illustrates examples of Manhattan and Atlanta world assumptions.
Figure 22C:
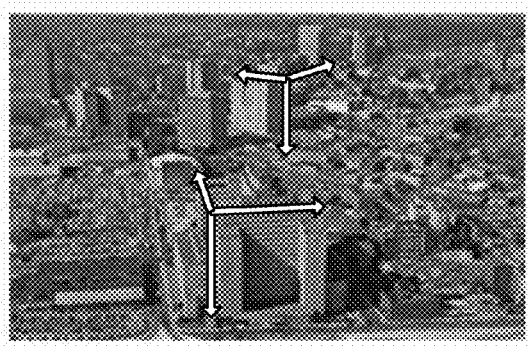

FIG. 22A shows an original image of a city scene take with a wide-angle lens and thus containing distortion. FIG. 22B shows results of the automatic upright adjustment technique applied to the image of FIG. 22A, according to at least some implementations.

Example System

Some implementations may include a means for automatic upright adjustment of images such as digital or digitized photographs, as described herein, and/or a means for camera calibration as described herein. For example, a module or modules of an application may receive input including but not limited to an image, obtain line segments from the image, and perform a calibration technique to simultaneously estimate camera parameters and vanishing points and lines, as described herein. In addition, a module or modules of an application may obtain an estimate of camera parameters and vanishing points and lines for an image, and optimize a reprojection model with respect to parameters of a homography matrix to estimate new camera parameters using one or more criteria based on human perception as energy terms to constrain the optimization, and reproject the image according to the new camera parameters, as described herein. The module or modules may in some implementations be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform the camera calibration technique and/or the reprojection technique, as described herein. Other implementations of the module or modules may be at least partially implemented by hardware circuitry and/or firmware stored, for example, in a non-volatile memory.

Figure 23:
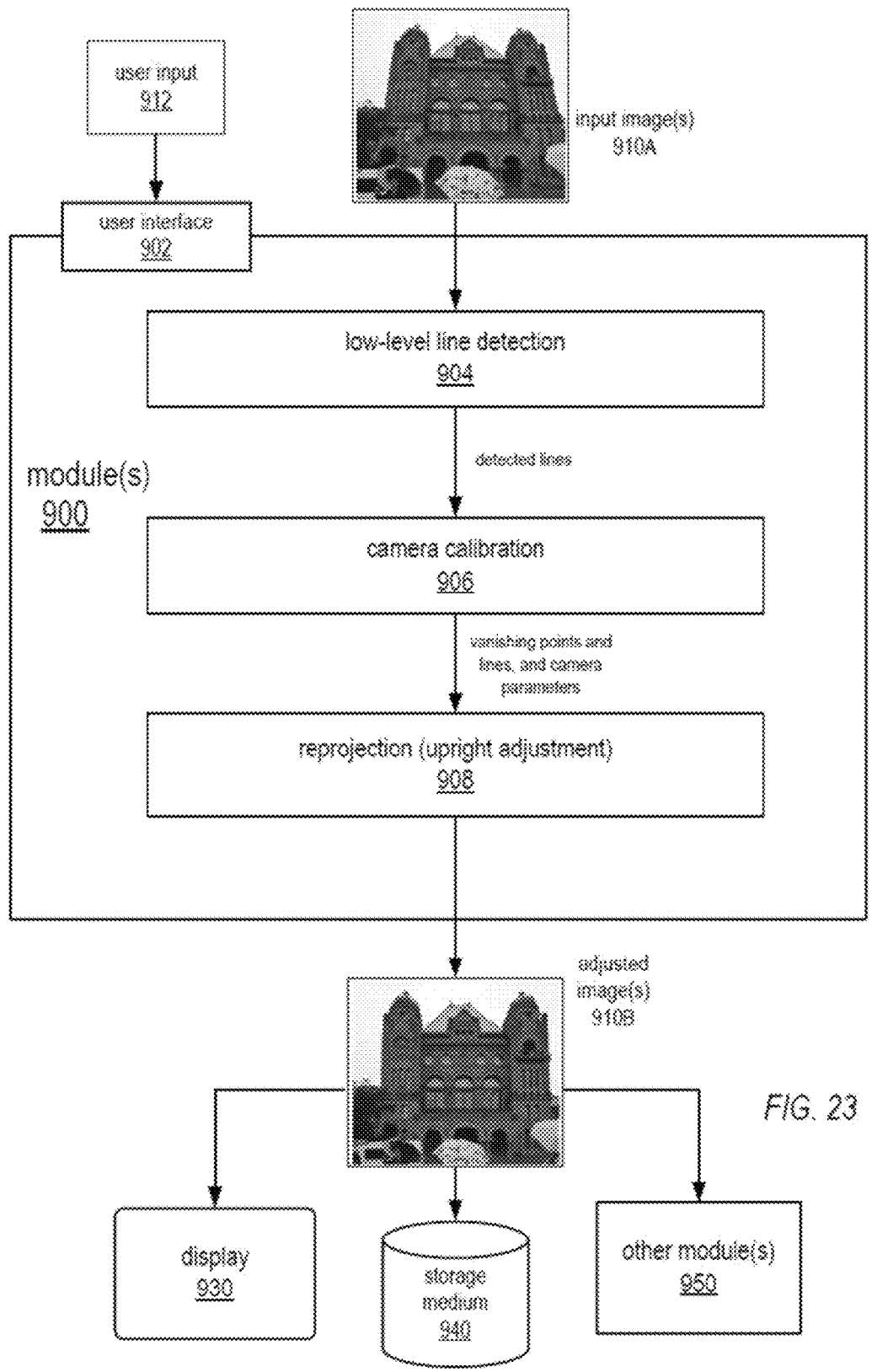
FIG. 23 illustrates example module or modules that may implement an automatic upright adjustment technique, according to at least some implementations.
Figure 24:
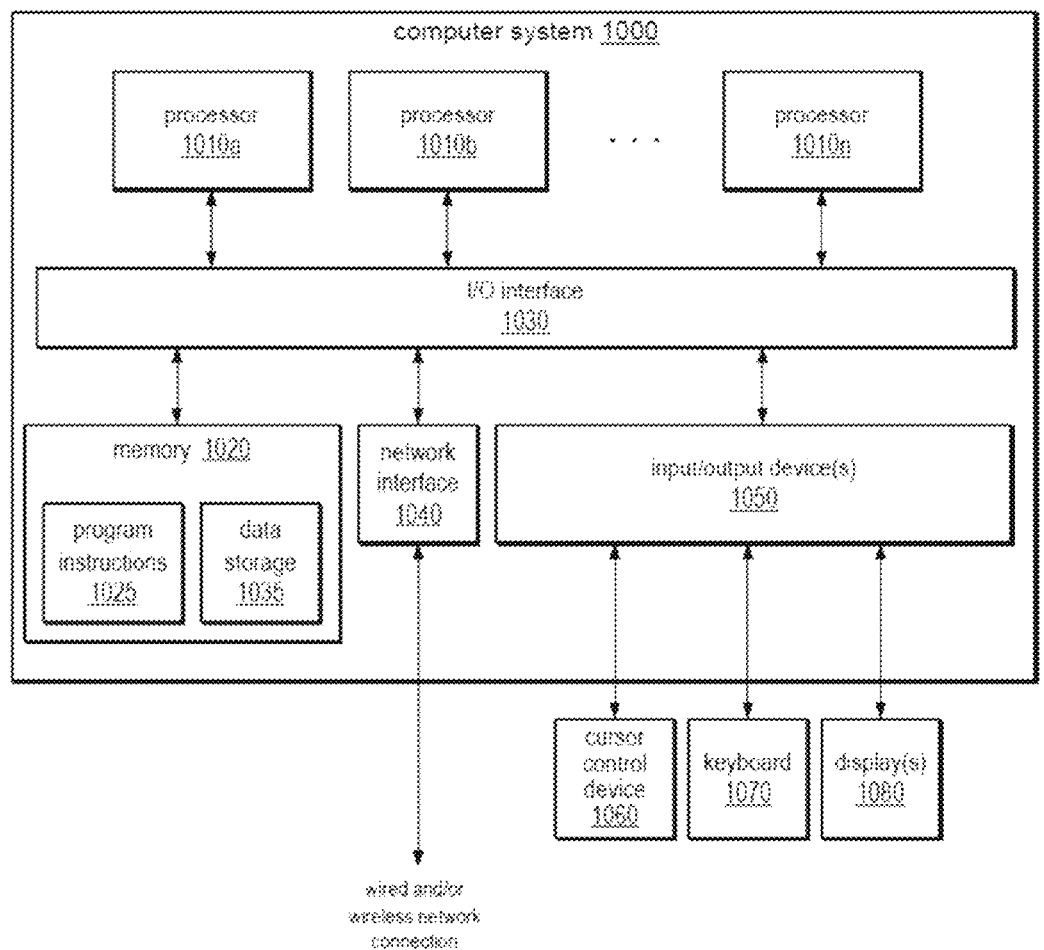
FIG. 24 illustrates an example computer system that may be used in implementations.

FIG. 23 illustrates an example module or modules that may implement one or more of the techniques for automatic upright adjustment of images as illustrated in FIGS. 1 through 22B. FIG. 24 illustrates an example computer system on which implementations of module(s) 900 may be implemented. Module(s) 900 receives as input one or more digital images 910A that each displays a scene. In some implementations, module(s) 900 may receive user input 912 via user interface 902 specifying one or more parameters for a camera calibration technique as described herein and/or for a reprojection technique as described herein. Module(s) 900 performs low-level line detection 904 to obtain line segments from the image 910A. Module 900 then performs camera calibration 906 to estimate camera parameters and vanishing point information for the image 910A. Module 900 then performs a reprojection technique 908 that estimates new camera parameters as described herein, and applies the new camera parameters to reproject image 910A. Module(s) 900 generates as output an adjusted image 910B for each input image 910A. Adjusted image 910B may, for example, be displayed on a display 930 device, stored to a storage medium 940, such as system memory, a disk drive, DVD, CD, etc., and/or passed on to one or more other modules 950 for additional processing. In some implementations, module(s) 900 may crop the reprojected image prior to outputting adjusted image 910B.

Implementations of the module(s) 900 or one or more of the techniques for automatic upright adjustment of images as illustrated in FIGS. 1 through 22B may be implemented as plug-in(s) for applications, as library functions, and/or as a stand-alone application. Implementations of the module or one or more of the techniques and algorithms as described herein may be implemented in any image processing application, including but not limited to Adobe® PhotoShop®, Adobe® PhotoShop® Elements®, and Adobe® After Effects®. Adobe, PhotoShop, PhotoShop Elements, and Adobe After Effects are either registered trademarks or trademarks of Adobe Systems Incorporated in the United States and/or other countries.

Implementations of the techniques for automatic upright adjustment of images as illustrated in FIGS. 1 through 22B may be executed on one or more computer systems, which may interact with various other devices. One such computer system is illustrated by FIG. 24. In different implementations, computer system 1000 may be any of various types of devices, including, but not limited to, a personal computer system, desktop computer, laptop, notebook, or netbook computer, pad or tablet device, mainframe computer system, handheld computer, workstation, network computer, a camera, a set top box, a mobile device, a wireless phone, a smart phone, a consumer device, video game console, handheld video game device, application server, storage device, a peripheral device such as a switch, modem, router, or in general any type of computing or electronic device.

In the illustrated implementation, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Computer system 1000 may also include one or more touch- or multi-touch-enabled devices as input/output devices, for example a touch-enabled display and/or pad. In some implementations, it is contemplated that implementations may be implemented using a single instance of computer system 1000, while in other implementations multiple such systems, or multiple nodes making up computer system 1000, may be configured to host different portions or instances of implementations. For example, in one implementation some elements may be implemented via one or more nodes of computer system 1000 that are distinct from those nodes implementing other elements.

In various implementations, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various implementations, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some implementations, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various implementations, the image processing techniques disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various implementations, system memory 1020 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above for implementations of the techniques for automatic upright adjustment of images as illustrated in FIGS. 1 through 22B are shown stored within system memory 1020 as program instructions 1025 and data storage 1035, respectively. In other implementations, program instructions and/or data may be received, sent or stored upon different types of computer accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one implementation, I/O interface 1030 may be configured to coordinate I/O traffic between processor 1010, system memory 1020, and any peripheral devices in the device, including network interface 1040 or other peripheral interfaces, such as input/output devices 1050. In some implementations, I/O interface 1030 may perform any necessary protocol, timing or other data transformations to convert data signals from one component (e.g., system memory 1020) into a format suitable for use by another component (e.g., processor 1010). In some implementations, I/O interface 1030 may include support for devices attached through various types of peripheral buses, such as a variant of the Peripheral Component Interconnect (PCI) bus standard or the Universal Serial Bus (USB) standard, for example. In some implementations, the function of I/O interface 1030 may be split into two or more separate components, such as a north bridge and a south bridge, for example. In addition, in some implementations some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various implementations, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some implementations, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some implementations, similar input/output devices may be separate from computer system 1000 and may interact with one or more nodes of computer system 1000 through a wired or wireless connection, such as over network interface 1040.

As shown in FIG. 24, memory 1020 may include program instructions 1025, configured to implement implementations of the techniques for automatic upright adjustment of images as illustrated in FIGS. 1 through 22B, and data storage 1035, comprising various data accessible by program instructions 1025. In one implementation, program instructions 1025 may include software elements of implementations of the techniques for automatic upright adjustment of images as illustrated in the above Figures. Data storage 1035 may include data that may be used in implementations. In other implementations, other or different software elements and data may be included.

Those skilled in the art will appreciate that computer system 1000 is merely illustrative and is not intended to limit the scope of the techniques for automatic upright adjustment of images as described herein. In particular, the computer system and devices may include any combination of hardware or software that can perform the indicated functions, including a computer, personal computer system, desktop computer, laptop, notebook, or netbook computer, pad or tablet device, mainframe computer system, handheld computer, workstation, network computer, a camera, a set top box, a mobile device, network device, internet appliance, PDA, wireless phones, smart phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other implementations some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some implementations, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various implementations may further include receiving, sending or storing instructions and/or data implemented in accordance with the foregoing description upon a computer accessible medium. Accordingly, the present invention may be practiced with other computer system configurations.

CONCLUSION

Various implementations may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various techniques as illustrated in the Figures and described herein represent example implementations of techniques. The techniques may be implemented in software, hardware, or a combination thereof. The order of technique may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. In a digital medium environment to adjust alignment of at least one feature in a digital image of a scene consistent with human perception, a computing device comprising:
   a memory configured to maintain the digital image;
   a processor system configured to execute an image processing application that is implemented to perform operations including:
   extracting line segments from the digital image;
   identifying an orthogonal frame of the digital image based on the extracted line segments, the orthogonal frame having an additional horizontal direction that shares a same vertical direction;
   estimating an eye-level of the scene based on the orthogonal frame having an additional horizontal direction; and
   calibrating camera parameters as a basis to adjust alignment of the at least one feature in relation to an axis of the digital image according to one or more human perception-based criteria that include the estimated eye-level of the scene.

2. A computing device as described in claim 1, wherein the orthogonal frame follows an Atlanta world assumption in which the image includes multiple orthogonal directions that do not align, one to another.

3. A computing device as described in claim 1, wherein the axis is a vertical or horizontal axis and the at least one feature is substantially aligned with the vertical or horizontal axis subsequent to calibrating the camera parameters.

4. A computing device as described in claim 1, wherein the extracting includes extracting Manhattan directions and additional horizontal vanishing points.

5. A computing device as described in claim 1, wherein the identifying further includes determining vanishing lines for each vanishing point.

6. A computing device as described in claim 1, wherein said calibrating camera parameters includes setting an x-axis focal length and a y-axis focal length, the y-axis focal length being different than the x-axis focal length.

7. A computing device as described in claim 1, wherein the camera parameters include an intrinsic camera parameter matrix and three dimensional rotation matrices.

8. A computing device as described in claim 1, wherein the image processing application is further implemented to generate an adjusted digital image based on calibrating the camera parameters.

9. In a digital medium environment to adjust alignment of at least one feature in a digital image of a scene consistent with human perception, a method implemented by a computing device, the method comprising:
   extracting, by the computing device, line segments from the digital image;
   identifying, by the computing device, an orthogonal frame of the digital image based on the extracted line segments, the orthogonal frame having an additional horizontal direction that shares a same vertical direction;
   estimating, by the computing device, an eye-level of the scene based on the orthogonal frame having an additional horizontal direction; and
   calibrating, by the computing device, camera parameters as a basis to adjust alignment of the at least one feature in relation to an axis of the digital image according to one or more human perception-based criteria that include the estimated eye-level of the scene.

10. A method as described in claim 9, wherein the orthogonal frame follows an Atlanta world assumption in which the image includes multiple orthogonal directions that do not align, one to another.

11. A method as described in claim 9, wherein the axis is a vertical or horizontal axis and the at least one feature is substantially aligned with the vertical or horizontal axis subsequent to calibrating the camera parameters.

12. A method as described in claim 9, wherein the extracting includes extracting Manhattan directions and additional horizontal vanishing points.

13. A method as described in claim 9, the identifying further comprising determining vanishing lines for each vanishing point.

14. A method as described in claim 9, further comprising generating an adjusted digital image based on calibrating the camera parameters.

15. In a digital medium environment to adjust alignment of at least one feature in a digital image of a scene consistent with human perception, a system comprising:
   means for identifying an orthogonal frame of the digital image based on line segments extracted from the digital image, the orthogonal frame having an additional horizontal direction that shares a same vertical direction;
   means for estimating an eye-level of the scene based on the orthogonal frame having an additional horizontal direction; and
   means for calibrating camera parameters as a basis to adjust alignment of the at least one feature in relation to an axis of the digital image according to one or more human perception-based criteria that include the estimated eye-level of the scene.

16. A system as described in claim 15, wherein the orthogonal frame follows an Atlanta world assumption in which the image includes multiple orthogonal directions that do not align, one to another.

17. A system as described in claim 15, wherein the axis is a vertical or horizontal axis and the at least one feature is substantially aligned with the vertical or horizontal axis subsequent to calibrating the camera parameters.

18. A system as described in claim 15, the means for identifying an orthogonal frame further comprising means for identifying Manhattan directions and additional horizontal vanishing points.

19. A system as described in claim 15, the means for identifying an orthogonal frame further comprising means for determining vanishing lines for each vanishing point.

20. A system as described in claim 15, further comprising means for generating an adjusted digital image based on calibrating the camera parameters.

* * * * *